United States Patent
Wang et al.

(10) Patent No.: US 11,583,949 B2
(45) Date of Patent: Feb. 21, 2023

(54) SWING/ROTATING GAS METAL ARC WELDING TORCH AND USE METHOD THEREFOR

(71) Applicants: JIANGSU UNIVERSITY OF SCIENCE AND TECHNOLOGY, Jiangsu (CN); NANTONG DONGDE STEEL CO., LTD, Jiangsu (CN)

(72) Inventors: Jiayou Wang, Jiangsu (CN); Jie Zhu, Jiangsu (CN); Tianwei Wang, Jiangsu (CN); Wei Wang, Jiangsu (CN); Kai Wang, Jiangsu (CN); Da Jiang, Jiangsu (CN); Biao Wang, Jiangsu (CN); Yuqing Jiang, Jiangsu (CN); Jianjian Pang, Jiangsu (CN); Luxiao Zhang, Jiangsu (CN)

(73) Assignees: JIANGSU UNIVERSITY OF SCIENCE AND TECHNOLOGY, Jiangsu (CN); NANTONG DONGDE STEEL CO., LTD, Jiangsu (CN)

(*) Notice: Subject to any disclaimer, the term of this patent is extended or adjusted under 35 U.S.C. 154(b) by 0 days.

(21) Appl. No.: 17/764,984

(22) PCT Filed: Sep. 18, 2020

(86) PCT No.: PCT/CN2020/116117
§ 371 (c)(1),
(2) Date: Mar. 30, 2022

(87) PCT Pub. No.: WO2021/218005
PCT Pub. Date: Nov. 4, 2021

(65) Prior Publication Data
US 2022/0388088 A1    Dec. 8, 2022

(30) Foreign Application Priority Data
Apr. 26, 2020 (CN) .......................... 202010337635.6

(51) Int. Cl.
B23K 9/28        (2006.01)
H02K 11/22      (2016.01)
(Continued)

(52) U.S. Cl.
CPC .............. B23K 9/287 (2013.01); B23K 9/164 (2013.01); B23K 9/285 (2013.01); H02K 5/145 (2013.01);
(Continued)

(58) Field of Classification Search
CPC ........ B23K 9/287; B23K 9/164; B23K 9/285; B23K 9/295; B23K 9/30; B23K 9/173; B23K 9/32
(Continued)

(56) References Cited

U.S. PATENT DOCUMENTS 4,401,878 A      8/1983  Roen
2018/0345402 A1* 12/2018 Wall ...................... B23K 9/295

FOREIGN PATENT DOCUMENTS

CN       1657211      8/2005
CN       101412143    4/2009
(Continued)

OTHER PUBLICATIONS

"International Search Report (Form PCT/ISA/210) of PCT/CN2020/116117," dated Feb. 1, 2021, with English translation thereof, pp. 1-7.
(Continued)

*Primary Examiner* — Phuong T Nguyen
(74) *Attorney, Agent, or Firm* — JCIPRNET

(57) ABSTRACT

A swing/rotating gas metal arc welding torch, include a hollow shaft motor and a feeder panel. An upper extending shaft of the feeder panel penetrates through a brush mechanism, and is fixedly connected to a lower extension shaft of the hollow shaft by means of a coupling, and a lower
(Continued)

extending shaft of the feeder panel penetrates through a support bearing mounted in a brush base and is then connected to an eccentric or bent conductive rod mechanism; the motor base is fixedly connected to the brush base by means of connecting screws, and a welding shielding gas is provided and welding torch cooling is achieved by means of inner holes of the connecting screws as well as a built-in gas passage and a cooling water passage of the brush base; the length of the conductive rod mechanism is adjusted by means of modulation or extension and retraction.

19 Claims, 14 Drawing Sheets

(51) Int. Cl.

| | |
|---|---|
| *H02K 5/20* | (2006.01) |
| *B23K 9/16* | (2006.01) |
| *H02K 5/14* | (2006.01) |
| *H02K 7/00* | (2006.01) |
| *H02K 9/19* | (2006.01) |
| *H02K 9/28* | (2006.01) |
| *H02P 6/16* | (2016.01) |

(52) U.S. Cl.
CPC ............. *H02K 5/203* (2021.01); *H02K 7/003* (2013.01); *H02K 9/19* (2013.01); *H02K 9/28* (2013.01); *H02K 11/22* (2016.01); *H02P 6/16* (2013.01)

(58) Field of Classification Search
USPC ................... 219/137.31, 125.11, 125.12, 74
See application file for complete search history.

(56) References Cited

FOREIGN PATENT DOCUMENTS

| | | |
|---|---|---|
| CN | 106180990 | 12/2016 |
| CN | 106180994 | 12/2016 |
| CN | 111390358 | 7/2020 |
| JP | 2007098419 | 4/2007 |

OTHER PUBLICATIONS

"Written Opinion of the International Searching Authority (Form PCT/ISA/237) of PCT/CN2020/116117," dated Feb. 1, 2021, with English translation thereof, pp. 1-12.

\* cited by examiner

SWING/ROTATING GAS METAL ARC WELDING TORCH AND USE METHOD THEREFOR

CROSS-REFERENCE TO RELATED APPLICATION

This application is a 371 of international application of PCT application serial no. PCT/CN2020/116117, filed on Sep. 18, 2020, which claims the priority benefit of China application no. 202010337635.6, filed on Apr. 26, 2020. The entirety of each of the above mentioned patent applications is hereby incorporated by reference herein and made a part of this specification.

TECHNICAL FIELD

The present invention relates to the technical field of arc welding, in particular to a swing/rotating gas metal arc welding torch and a use method therefor.

BACKGROUND

Gas metal arc welding is an arc welding method which takes a welding wire as a consumable electrode, adopts argon gas, $CO_2$ gas or an argon-rich gas mixture and the like as a protective medium or adopts a self-shielded flux-cored wire. This method is suitable for welding on various positions such as a flat position and a spatial position, and is widely applied to metal manufacturing. The control on oscillating, swing or rotating motion of a welding arc is often required for improving the formation of a weld and the performance of a welded joint.

In accordance with Chinese Patent Applications with Publication No. CN1657211A entitled "Rotary Electric Arc Narrow Gap Welding Method and Device Driven by Hollow Shaft Motor" and Publication No. CN101412143A entitled "Swing Arc Narrow Gap Consumable Electrode Gas Shielded Welding Method and Welding Torch", a hollow shaft motor directly drives an eccentric contact tube mechanism or a bent conductive rod mechanism by means of a coupling to drive the arc to perform unidirectional rotating motion or reciprocating circular-arc swing in a narrow-gap groove, thereby respectively achieving arc narrow gap fusion welding and swing arc narrow-gap fusion welding. The disadvantages of such a welding torch are that: firstly, only single rotating arc or swing arc narrow gap welding may be achieved as a result of a single arc motion control way and a narrow scope of application. Secondly, indirect positioning is achieved between a motor base and a bearing seat by means of a supporting plate, thereby resulting in low transmission positioning precision and great motor rotating resistance. Thirdly, a special sensing detection device for arc rotating frequency or swing frequency which is arranged between a motor mechanism and an electric brush mechanism is adopted, so that a welding torch mechanism is complicated. Fourthly, without a built-in cooling water passage, the welding torch body is easily heated by welding heat radiation. Fifthly, without a built-in gas passage, a welding torch nozzle mechanism only with an external nozzle mechanism is complicated. Sixthly, the conductive rod and the contact with relatively fixed structural forms and dimensions are adopted, so that process adaptability is relatively poor.

In accordance with Chinese Patent Application with Publication No. CN106180994A entitled "Rotary Oscillating type Welding Torch and Welding Method", disclosed is a welding torch in which a motor drives a rotary conducting seat or a curved contact tube fixedly connected thereto, so that arc rotating or oscillating is achieved. The disadvantages are that: firstly, the arc rotating motion mechanism is complex and the transmission positioning precision is not high as the rotary conducting seat adopts double-bearing support. Secondly, contact welding feed is performed with graphite powder, and feed stability is worse. Thirdly, the curved contact tube is a consumable part, so that the implementation cost is high. Fourthly, a rotary oscillating angle of the contact tube is detected by means of a special position sensing mechanism, so that the welding torch mechanism is complicated. Fifthly, the conductive rod mechanism is fixed and single in structural form, is poor in modulation and adjustability, and is worse in process adaptability. Sixthly, the welding torch is only applied for narrow gap arc welding.

SUMMARY

To overcome the problems and the disadvantages in the prior art, the present invention provides a swing/rotating gas metal arc welding torch which is simple in welding torch structure, high in transmission positioning precision, good in process adaptability and high in practicability, and a use method therefor.

To achieve the objective, the present invention is achieved by adopting the following technical solution.

A swing/rotating gas metal arc welding torch includes a hollow shaft motor 4, a motor base 9, an electric brush base 14, a feeder panel, a coupling 5, a conductive rod mechanism 17, and an electric bush 7 and a pressing spring 6 thereof, wherein the motor base 9 is a cylindrical body with convex shoulders 9b in an outer middle part, and a mounting hole 9a for locking the coupling 5 is formed in one side of the motor base, a step-shaped center hole which is small in top and large in bottom is formed in the motor base, and the pressing spring 6 is mounted in a large hole 9g of the step-shaped center hole; a cross counterbore 14m and a center hole which is large in top and small in bottom are sequentially formed in the electric brush base 14 from top to bottom, the electric brush 7 is mounted in the cross counterbore 14m, a support bearing 12 is mounted in the large center hole 14n, and a gas passage and/or cooling water passage is arranged in a wall of the electric brush base; the feeder panel is a cylindrical body with an upper extending shaft 11a and a lower extending shaft 11b, and a flange table 11c in middle, the upper extending shaft 11a of the feeder panel sequentially penetrates through the electric brush 7 and the pressing spring 6 and then is fixedly connected to the lower extending shaft 4a of the hollow shaft motor 4 in the motor base 9 by means of the coupling 5, so that the electric bush 7 is in tight sliding conductive contact with the upper end surface of the flange table 11c of the feeder panel, and the lower extending shaft 11b of the feeder panel penetrates through the support bearing 12 and a small center hole 14p in the bottom of the electric brush base 14 and then is directly connected to the conductive rod mechanism 17 or connected to the conductive rod mechanism 17 by means of a connector mechanism 15; the hollow shaft motor 4 is fixedly mounted on the upper end surface of the motor base 9, the convex shoulders 9b at the two sides of the middle of the motor base are fixedly connected to the upper end of the electric brush base 14 by means of connecting screws, and one ends of connecting cables 7a at the two sides of the electric brush are fixedly connected to the electric brush 7 and the other ends of the connecting cables are fixedly connected to cable fasteners 8a fixed to the convex shoulders 9b of the motor base 9; and the conductive rod mechanism 17 is a modulating eccentric conductive rod mechanism or a modulating curved conductive rod mechanism or an extendable and retractable eccentric conductive rod mechanism or an extendable and retractable eccentric curved conductive rod mechanism.

Further preferably, the modulating conductive rod mechanism 17 is composed of a conductive rod and a contact tube, wherein a bent conductive rod 17a is connected to a first straight contact tube 17b to form a curved conductive rod mechanism, or a first straight conductive rod 17c is connected to a bent contact tube 17d to form a curved conductive rod mechanism, or a second straight conductive rod 17e is obliquely connected to a second straight contact tube 17f to form a curved conductive rod mechanism, or a first straight conductive rod 17c is connected to an eccentric contact tube 17h to form an eccentric conductive rod mechanism; alternatively, the modulating conductive rod mechanism 17 is directly composed of the lower extending shaft 11b of the feeder panel and a contact tube, wherein a first straight lower part of the lower extending shaft 11b of the feeder panel is connected to an eccentric contact tube 17g to form an eccentric conductive rod mechanism, or a first straight lower part of the lower extending shaft 11b of the feeder panel is connected to a bent contact tube 17d to form a curved conductive rod mechanism, or a second straight lower part of the lower extending shaft 11b of the feeder panel is obliquely connected to a second straight contact tube 17f to form a curved conductive rod mechanism, or a bent lower part of the lower extending shaft 11b of the feeder panel is connected to a first straight contact tube 17b to form a curved conductive rod mechanism.

Further preferably, the extendable and retractable conductive rod mechanism 17 is composed of a first extendable and retractable conductive rod with outer threads on the upper part and a contact tube connected to the lower end thereof or is directly composed of a first extendable and retractable contact tube with outer threads on the upper part; the upper section of the outer threaded section of the first extendable and retractable conductive rod or the first extendable and retractable contact tube is screwed into a center hole in the lower part of the lower extending shaft 11b of the feeder panel which serves as an arc motion output shaft 11d in a relative extendable and retractable threaded connection mode, and a first locking nut 15a which serves as a connector mechanism 15 is screwed on the lower section of the outer threaded section thereof, so that the first locking nut 15a is in locking connection with the lower end surface of the lower extending shaft 11b of the feeder panel to form a conductive rod mechanism extension and retraction adjusting device consisting of the extendable and retractable conductive rod mechanism 17, and the first locking nut 15a and the arc motion output shaft 11d;

alternatively, the extendable and retractable conductive rod mechanism 17 is composed of a second extendable and retractable conductive rod with outer threads on the upper part and a contact tube connected to the lower end thereof or is directly composed of a second extendable and retractable contact tube with outer threads on the upper part, and the outer threaded section thereof is a flat cylindrical body with a waist-shaped cross section; the conductive rod mechanism extension and retraction adjusting device consists of the extendable and retractable conductive rod mechanism 17, a connector mechanism 15, a directional shaft sleeve 11e and an arc motion output shaft 11d, and the connector mechanism 15 consists of a connecting nut 15b, a T-shaped adjusting nut 15c and a second locking nut 15d, and the directional shaft sleeve 11e is a cylindrical body or a stepped cylindrical body with a waist-shaped through hole in the longitudinal direction, and is fixedly arranged in the center hole in the lower part of the lower extending shaft 11b of the feeder panel which serves as the arc motion output shaft 11d; the upper section of the outer threaded section of the second extendable and retractable conductive rod or the second extendable and retractable contact tube is inserted into the waist-shaped through hole of the directional shaft sleeve 11e in an extendable and retractable sliding mode, and the T-shaped adjusting nut 15c and the second locking nut 15d are screwed on the lower section of the outer threaded section from top to bottom in sequence, the connecting nut 15b is sleeved on the T-shaped adjusting nut 15c from the lower end and then is connected to the outer threads on the lower part of the lower extending shaft 11b of the feeder panel, and inner convex shoulders at the lower end of the connecting nut 15b press the lower end surface of a flanging flange at the top end of the T-shaped adjusting nut 15c, so that the upper end surface of the T-shaped adjusting nut 15c and the lower end surface of the lower extending shaft 11b of the feeder panel are in a pressing state, and the second locking nut 15d and the lower end surface of the T-shaped adjusting nut 15c are in locking connection;

wherein the first extendable and retractable conductive rod or the second extendable and retractable conductive rod is a bent conductive rod 17a connected to a first straight contact tube 17b or a first straight conductive rod 17c connected to a bent contact tube 17d or an eccentric contact tube 17g or a second straight conductive rod 17e obliquely connected to a second straight contact tube 17f; and the first extendable and retractable contact tube or the second extendable and retractable contact tube is a bent contact tube 17d or an eccentric contact tube 17g.

Further preferably, an inner through hole of the first locking nut 15a sequentially includes an inner threaded hole with a length of $L_1$ and an un-threaded hole with a length of $L_2$ from top to bottom, and the center hole in the lower part of the lower extending shaft 11b of the feeder panel sequentially includes an inner threaded hole with a length of $L_3$ and an un-threaded hole with a length of $L_4$ from bottom to top, where $L_2 \geq L_0$, $(L_3+L_4)$ is equal to $(L_e+L_0)$, $L_0$ is an extension and retraction adjustable length, $L_e$ is a shortest thread engaging length between the first extendable and retractable conductive rod or the first extendable and retractable contact tube and the lower extending shaft 11b of the feeder panel, and the length of the outer threaded section on the upper part of the first extendable and retractable conductive rod or the first extendable and retractable contact tube is not smaller than $(L_1+L_e+L_0)$; alternatively, an inner through hole of the second locking nut 15d sequentially includes an inner threaded hole with a length of $L_5$ and an un-threaded hole with a length of $L_6$ from top to bottom, and the center hole in the lower part of the lower extending shaft 11b of the feeder panel is an un-threaded hole with a length of $L_0$, where $L_6 \geq L_0$, and $L_0$ is an extension and retraction adjustable length.

Further preferably, through holes for communicating with a welding shielding gas are longitudinally formed in the connecting screws, wherein the lower ends of the connecting screws are connected to a built-in gas passage in the wall of the electric bush base 14, and the upper ends of the connecting screws are connected to the welding shielding gas, so that the welding shielding gas passes through the inner through holes of the connecting screws and the built-in gas passage and then flows into an external nozzle mechanism of the welding torch body; and/or, through holes used for communicating with cooling water are longitudinally formed in the two connecting screws, wherein the upper end of the connecting screw at a water inlet side is connected to a cooling water leading-in end 25a, and the lower end thereof is connected to a built-in cooling water passage in the wall of the electric bush base 14, and the upper end of the connecting screw at a water outlet side is connected to a cooling water leading-out end 25b and the lower end thereof is connected to the built-in cooling water passage, so that cooling water flows in from the inner through hole of the connecting screw at the water inlet side, passes through the built-in cooling water passage, and flows out from the inner through hole of the connecting screw at the water outlet side.

Further preferably, the built-in gas passage includes two longitudinal gas passages, two transverse gas passages and an annular gas chamber, where the annular gas chamber is a central counterbore larger than the small center hole 14p, that is upwards formed from the bottom end surface of the electric brush base 14; the two longitudinal gas passages and the two transverse gas passages are respectively and symmetrically arranged at diagonally opposite sides of the annular gas chamber, where one ends of the transverse gas passages are connected to the lower ends of the longitudinal gas passages, and the other ends of the transverse gas passages are connected to the annular gas chamber, and the upper ends of the longitudinal gas passages are connected to the inner through holes of the connecting screws, so that the welding shielding gas passes through the inner through holes of the connecting screws, the longitudinal gas passages, the transverse gas passages and the annular gas chamber, and then flows into a sleeve-shaped nozzle mechanism 28 externally connected to the lower end of the welding torch body.

Further preferably, the built-in cooling water passage includes a longitudinal water inlet passage 14f, a rectangular transverse water passage consisting of transverse water passages 14h, 14i, 14j and 14k, and a longitudinal water outlet passage 14g, where the rectangular transverse passage is symmetrically arranged in the bottom wall of the electric brush base 14, and the longitudinal water inlet passage 14f and the longitudinal water outlet passage 14g are symmetrically arranged above the transverse water passages; the upper end of the longitudinal water inlet passage 14f is connected to an inner through hole of a third connecting screw 22c, and the lower end of the longitudinal water inlet passage 14f is connected to the transverse water passages, and the upper end of the longitudinal water outlet passage 14g is connected to an inner through hole of a fourth connecting screw 22d and the lower end of the longitudinal water outlet passage is connected to the transverse water passages, so that cooling water passes through the inner through hole of the third connecting screw 22c, the longitudinal water inlet passage 14f, the transverse water passages and the longitudinal water outlet passage 14g, and then flows out from the inner through hole of the fourth connecting screw 22d.

Further preferably, the welding torch further includes an inverted-L-shaped supporting frame consisting of a side plate 21b and a top plate 21a, where the lower side of the side plate 21b of the supporting frame is fixedly connected to the electric brush base 14, and a welding torch coupling head 20 is mounted on the upper end surface of the top plate 21a of the supporting frame, and cable connecting heads 8b are fixedly connected on the two side surfaces of the top plate of the supporting frame, so that a connecting cable 7a of the electric brush 7 passes through a cable fastener 8a and then is connected to the cable connecting heads 8b.

Further preferably, when the welding torch includes the supporting frame, the hollow shaft motor 4 has double extending shafts, a photoelectric switch device 23 for detecting an arc swing/rotating frequency or an arc swing midpoint C is arranged on the upper extending shaft 4b; the photoelectric switch device 23 is composed of an external grating disc 23a and an optical coupler 23b, and the optical coupler 23b is fixedly connected to the supporting frame.

To achieve the objective, the present invention is achieved by adopting another technical solution below.

A use method of a swing/rotating gas metal arc welding torch includes the following steps: (1) adopting a single-shaft extension hollow shaft motor 4 or a double-shaft extension hollow shaft motor 4 with a photoelectric switch device 23 on an upper extending shaft 4b of a motor as a drive motor for the swing/rotating arc welding torch, and obliquely feeding out a welding wire 2 from an inner hole of a contact tube at the lower end of an eccentric or curved conductive rod mechanism 17 after adjusting the conductive rod mechanism 17 to a proper length by a conductive rod mechanism modulation method or an extension and retraction adjusting method of the welding torch or directly selecting the conductive rod mechanism 17 with a proper length; (2) setting arc swing/rotating process parameters by means of a controller of the welding torch, where arc swing/rotating frequency is adjusted and set by an arc swing/rotating frequency detection method based on sensing of a built-in photoelectric encoder of the single-shaft extension servo type hollow shaft motor 4 or an external photoelectric switch device 23 of the double-shaft extension hollow shaft motor 4 or an arc swing/rotating frequency calibration method based on detection of a tachymeter; and during swing arc welding, automatically bending the welding wire 2 to the front or the rear of the welding direction by an arc swing midpoint detection method based on sensing of the built-in photoelectric encoder or the photoelectric switch device 23; and (3) providing a welding shielding gas to the external nozzle mechanism of the welding torch body through a built-in gas passage of the welding torch body and/or an external gas passage of the nozzle mechanism; rotating, by the drive motor, an arc motion output shaft and a modulating or extendable and retractable conductive rod mechanism 17 connected to the lower end of the arc motion output shaft, to drive an arc 16 on the end part of the welding wire 2 to perform unidirectional rotating motion 19 around a center line 1 of the welding torch or reciprocating circular-arc swing 18, and detecting and displaying arc swing or rotating frequency according to the arc swing/rotating frequency detection method, thereby achieving swing/rotating gas metal arc welding.

Further preferably, the arc swing midpoint detection method includes the following steps:

(1) when the built-in photoelectric encoder is an absolute photoelectric encoder, rotating the arc motion output shaft 11d of the welding torch, so that the welding wire 2 obliquely fed out from the conductive rod mechanism 17 is bent to the front or the rear of the welding; and according to a motor rotation angle position electric pulse signal generated after the servo motor driver decodes the output signal of the built-in photoelectric encoder or directly according to a motor rotation angle position electric signal output by the built-in photoelectric encoder, recording, by the controller of the welding torch, an absolute position angle θ of motor rotation at a current position and taking the absolute position angle θ as a motor rotating midpoint position 33 corresponding to an arc swing midpoint C, thereby achieving position setting of the arc swing midpoint C after initially mounting or replacing the conductive rod mechanism 17; and (2) before each welding, according to the motor rotation angle position electric pulse signal generated after the servo motor driver decodes the output signal of the built-in photoelectric encoder or directly according to the motor rotation angle position electric signal output by the built-in photoelectric encoder, guiding, by the controller of the welding torch, the motor to rotate to the motor rotating midpoint position 33 corresponding to the absolute position angle θ, so that the welding wire 2 obliquely fed out from the conductive rod mechanism 17 is automatically bent to the front or the rear of the welding direction, thereby achieving automatic detection and positioning before welding of the arc swing midpoint C;

wherein when the curved conductive rod mechanism 17 composed of the bent conductive rod 17a and the first straight contact tube 17b or the curved conductive rod mechanism 17 composed of the second straight conductive rod 17e and the second straight contact tube 17f obliquely connected to the second straight conductive rod is adopted, and the conductive rod is fixedly connected to the arc motion output shaft 11d in fixed and consistent relative positions by means of a connector mechanism 15, the operation in step (1) is only used during initial mounting and debugging of the conductive rod mechanism 17; or, when the curved conductive rod mechanism 17 composed of the bent lower part of the arc motion output shaft 11d and the first straight contact tube 17b or the curved conductive rod mechanism 17 composed of the second straight lower part of the arc motion output shaft 11d and the second straight contact tube 17f obliquely connected to the second straight lower part is adopted, the operation in step (1) is only used during initial mounting and debugging of the conductive rod mechanism 17.

Further preferably, the frequency detection method includes an arc swing frequency detection method and an arc rotating frequency detection method, where the arc swing frequency detection method specifically includes: in a process that the welding wire 2 before welding or the arc 16 during welding performs left and right symmetrical circular-arc-shaped swing 18 around the arc swing midpoint C, detecting, by the servo motor driver, the motor rotating angle position in real time after decoding the motor rotating angle position electric signal output by the built-in photoelectric encoder of the servo motor, and according to a left side/right side positioning accomplishing pulse electric signal output by the servo motor driver when the motor rotates to the left side or right side limit position, detecting, by the controller of the welding torch, the elapsed time $t_1$ that the motor rotates to the limit positions for every successive three times or rotates to the limit position at the same side for every successive two times to realize real-time detection of the arc swing frequency $f_1$, where $f_1$ is equal to I/O; and the arc rotating frequency detection method specifically includes: in a process that the welding wire 2 before welding or the arc 16 during welding performs unidirectional rotating motion 19 around the center line 1 of the welding torch, detecting, by the servo motor driver, the motor rotating angle position in real time after decoding the motor rotating angle position electric signal output by the built-in photoelectric encoder of the servo motor, and according to a positioning accomplishing pulse electric signal for one revolution of the motor that is output by the servo motor driver, detecting, by the controller of the welding torch, a time interval $t_2$ between two adjacent positioning accomplishing pulses to realize real-time detection of the arc rotating frequency $f_2$, where $f_2$ is equal to $1/t_2$.

Further preferably, the conductive rod mechanism modulation method includes the following steps:

(1) selecting construction of the conductive rod mechanism: when an external sleeve-shaped nozzle mechanism 28 is adopted for narrow gap or narrow groove multi-layer welding, the bent conductive rod 17a is connected to the first straight contact tube 17b, or the first straight conductive rod 17c is connected to the bent contact tube 17d or the eccentric contact tube 17g or the second straight conductive rod 17e is obliquely connected to the second straight contact tube 17f to form a modulating eccentric or curved conductive rod mechanism 17; or directly, the first straight lower part of the arc motion output shaft is connected to the bent contact tube 17d or the eccentric contact tube 17g, or the second straight lower part is obliquely connected to the second straight contact tube 17f, or the bent lower part is connected to the first straight contact tube 17b to form a modulating eccentric or curved conductive rod mechanism 17;

(2) selecting the length of the conductive rod or the contact tube: by setting L as a current vertical length of the conductive rod mechanism 17 during welding of current weld to be welded, and $L_{i-1}$ as a last vertical length of the conductive rod mechanism during welding of last-layer weld, the conductive rod or contact tube is replaced with a shorter conductive rod or contact tube based on the adjusting principle of $L_i=(L_{i-1}-h_0)$ according to a filler metal height $h_0$ of the last-layer weld every time welding of one layer of the weld is completed, so as to keep a height $h_2$ of the welding torch at a constant value when a height $h_1$ of the nozzle is kept constant;

(3) selecting an arc swing angle or an adjusting way for a length of the conductive rod mechanism for rotating arc welding: during swing arc welding, the arc swing angle is correspondingly adjusted to $\alpha_i$ based on an adjusting principle of $\sin(\alpha_i/2)=(R_{i-1}/R_i)\cdot\sin(\alpha_{i-1}/2)$ according to arc swing radius changes caused by replacing the straight contact tube 17b or 17f or the eccentric contact tube 17g, where $R_i$ is current arc swing radius and $\alpha_i$ is a current arc swing angle during welding of the current weld to be welded, and $R_{i-1}$ is a last arc swing radius and $\alpha_{i-1}$ is a last arc swing angle during welding of the last-layer weld; or during swing arc welding, the arc swing angle is kept unchanged after replacing with the bent contact tube 17d or the conductive rod that has a shorter vertical section; or during rotating arc welding, adjustment on the length of the conductive rod or the contact tube is achieved by shortening the length of the vertical section of the conductive rod or the bent contact tube 17d in step (2) based on the adjusting principle of keeping the arc rotating radius R constant; and (4) conditionally ending the modulation process: specifically, the modulation process of the steps (2) and (3) is stopped once the lower end part of the conductive rod mechanism 17 is retracted into or nearly retracted into the sleeve-shaped nozzle mechanism 28; and the welding torch is lifted as a whole, so that each lifting amount of the welding torch position is approximately equal to the filler metal height $h_0$ of the last-layer weld, so as to keep the height $h_2$ of the welding torch constant until subsequent welding is accomplished.

Further preferably, the conductive rod mechanism extension and retraction adjusting method includes the following steps:

(1) loosening a first locking nut 15a which is in thread pair connection with a first extendable and retractable conductive rod or a first extendable and retractable contact tube in the conductive rod mechanism 17, so that the upper end surface of the first locking nut 15a is disengaged from the lower end surface of the arc motion output shaft 11d of the welding torch to be in an unlocking state; (2) rotating the first extendable and retractable conductive rod or the first extendable and retractable contact tube, so that the upper end of the first extendable and retractable conductive rod or the first extendable and retractable contact tube which is screwed in a threaded connection mode retracts upwards or extends downwards in the center hole in the lower part of the arc motion output shaft 11d, where when an external sleeve-shaped nozzle mechanism 28 is used for narrow gap or narrow groove multi-layer welding, each inward retraction adjusting amount of the first extendable and retractable conductive rod or the first extendable and retractable contact tube is approximately equal to the filler metal height $h_0$ of the last-layer weld; and (3) reversely rotating the first locking nut 15a, so that the upper end surface of the first locking nut 15a and the lower end surface of the arc motion output shaft 11d are in a locking state, thereby achieving extendable and retractable adjustment on the length of the conductive rod mechanism 17, where the extendable and retractable conductive rod mechanism 17 is composed of a first extendable and retractable conductive rod with outer threads on the upper part and a contact tube connected to the lower end of the first extendable and retractable conductive rod, or is directly composed of a first extendable and retractable contact tube with outer threads on the upper part.

Further preferably, the conductive rod mechanism extension and retraction adjusting method includes the following steps:

(1) adjusting preparation: loosening a second locking nut 15d which is in thread pair connection with the outer threads on the upper part of a second extendable and retractable conductive rod or a second extendable and retractable contact tube in the conductive rod mechanism 17, so that the upper end surface of the second locking nut 15d is disengaged from the lower end surface of a T-shaped adjusting nut 15c which is also screwed on the outer threaded section to be in an unlocking state; loosening a connecting nut 15b which is in thread pair connection with the outer threads on the lower part of the arc motion output shaft 11d of the welding torch, so that the upper end of the T-shaped adjusting nut 15c which is mated in the connecting nut 15b is disengaged from the lower end surface of the arc motion output shaft 11d;

(2) adjusting implementation: rotating the T-shaped adjusting nut 15c, so that the flat upper end of the second extendable and retractable conductive rod or the second extendable and retractable contact tube which is inserted in a sliding mode retracts upwards or extends downwards in a waist-shaped through hole of a cylindrical or step-shaped cylindrical directional shaft sleeve 11e fixed in the center hole in the lower part of the arc motion output shaft 11d, wherein when an external sleeve-shaped nozzle mechanism 28 is used for narrow gap or narrow groove multi-layer welding, each inward retraction adjusting amount of the second extendable and retractable conductive rod or the second extendable and retractable contact tube is approximately equal to the filler metal height $h_0$ of the last-layer weld; and (3) adjusting ending: reversely rotating and tightly screwing the connecting nut 15b and pressing the lower end surface of a flanging flange at the top end of the T-shaped adjusting nut 15c by inner convex shoulders at the lower end of the connecting nut 15b, so that the upper end surface of the T-shaped adjusting nut 15c and the lower end surface of the arc motion output shaft 11d are in a pressing state; and then reversely rotating the second locking nut 15d, so that the upper end surface of the second locking nut 15d and the lower end surface of the T-shaped adjusting nut 15c are in a locking state, thereby achieving extendable and retractable adjustment on the length of the conductive rod mechanism 17, where the extendable and retractable conductive rod mechanism 17 is composed of a second extendable and retractable conductive rod with outer threads on the upper part and a contact tube connected to the lower end of the second extendable and retractable conductive rod, or is directly composed of a second extendable and retractable contact tube with outer threads on the upper part, and the outer threaded section is a flat cylinder with a waist-shaped cross section.

Further preferably, the arc swing frequency calibration method includes the following steps:

(1) within the set value range of the arc swing angle, slowly rotating a speed measuring wheel or a speed measuring rod of a universal electromagnetic or a photoelectric switch type tachymeter in a left-right reciprocating mode, and observing the number of times of work k of a speed measuring switch in a complete reciprocating rotating process by using a sound/light prompt function of the meter after the speed measuring switch is positioned within the rotating angle range covered by the arc swing angle; or calibrating the swing frequency of the meter by means of an existing swing arc welding torch with an arc swing frequency real-time detection function or the swing arc welding torch adopting the photoelectric switch device 23, so as to determine a ratio k of a reading value of the meter to an actual value of the swing frequency value, where k is a positive integer not smaller than 1;

(2) pressing the speed measuring wheel or the speed measuring rod against the side surface or the bottom end surface of the arc motion output shaft of the welding torch, so that the speed measuring switch is positioned within the rotating angle range covered by the arc swing angle; and setting, by the controller of the welding torch, the arc swing angle and the retention time at the two sides, and then adjusting a rotating speed control amount of the drive motor, so that the drive motor rotates the arc motion output shaft and drives the speed measuring wheel or the speed measuring rod to synchronously rotate in a reciprocating mode; and (3) detecting a reciprocating rotating frequency of the arc motion output shaft, and taking the current motor rotating speed control amount as a set value or a calibrated value in the controller of the arc swing frequency when the rotating frequency reading on the meter reaches k times the expected value of the arc swing frequency, thereby achieving calibration on the arc swing frequency.

Compared with the prior art, the present invention has the following advantages and beneficial effects:

1) A special sensing device may not be arranged in the welding torch, but the arc swing/rotating frequency and the arc swing midpoint are detected or identified by means of the built-in photoelectric sensor of the hollow shaft servo motor or a pre-calibration mode of an auxiliary speed measuring device, so that the structure of the welding torch is remarkably simplified.

2) No sensing device for detecting the arc swing/rotating frequency and the arc swing midpoint is specially arranged or a sensing device is arranged on the upper extending shaft of the hollow shaft motor, and the motor base is fixedly connected to the support bearing seat (namely, the electric brush base) of the motor base. In such a manner, direct positioning between the welding torch drive mechanism and the transmission mechanism is achieved, transmission positioning precision is remarkably improved, rotating resistance of the drive motor is reduced, and working reliability is improved.

3) The inner through holes are formed in the connecting screws for fixedly connecting the motor base to the support bearing seat (namely, the electric brush base) to respectively introduce the welding shielding gas and the cooling water into the built-in gas passage and the built-in cooling water passage, so that the integral structure of the welding torch is more compact; and meanwhile, more effective cooling is provided for the welding torch and the practicability is improved.

4) a modulating or extendable and retractable conductive rod mechanism is adopted, and by modulating the construction form and the structural parameters of the conductive rod mechanism and by adjusting in stages or continuously the length of the conductive rod or the contact tube in the conductive rod mechanism, the welding torch can adapt to welding application needs with different plate thicknesses, different groove forms, different weld layers and different nozzle forms, and thus, the process adaptability is strong.

5) With the swing/rotating arc welding function, the welding torch can be used for gas metal arc welding, and also can be expandable and applicable to submerged arc welding; and with the arrangement of a flat nozzle capable of extending into a narrow gap groove, the welding torch can be used for thick-plate and narrow-gap gas metal arc welding. As a result, the welding torch is wide in scope of application and low in implementation cost.

BRIEF DESCRIPTION OF THE DRAWINGS

In FIG. 2A: 8b, cable connecting head; 20, welding torch coupling head; 21a, top plate of welding torch supporting frame; 21b, side plate of welding torch supporting frame; and 23, photoelectric switch device. In FIG. 2B: 4b, upper extending shaft of hollow shaft motor 4; 22a, first connecting screw; 22c, third connecting screw; 23a, external grating disc; and 23b, optical coupler. In FIG. 2C: 9a, mounting hole; 22b, second connecting screw; 22d, fourth connecting screw; 24a, welding shielding gas connected from outside of welding torch body; 25a, cooling water leading-in end; and 25b, cooling water leading-out end.

FIG. 3A is a structural schematic diagram of a curved conductive rod mechanism 17 composed of a bent conductive rod 17a and a first straight contact tube 17b connected to the bent conductive rod; FIG. 3B is a structural schematic diagram of a curved conductive rod mechanism 17 composed of a first straight conductive rod 17c and a bent contact tube 17d connected to the first straight conductive rod; FIG. 3C is a structural schematic diagram of a curved conductive rod mechanism 17 composed of a second straight conductive rod 17e and a second straight contact tube 17f obliquely connected to the second straight conductive rod; and FIG. 3D is a structural schematic diagram of an eccentric conductive rod mechanism 17 composed of a first straight conductive rod 17c and an eccentric contact tube 17g connected to the first straight conductive rod. In the figure: 17a, bent conductive rod; 17b, first straight contact tube; 17c, first straight conductive rod; 17d, bent contact tube; 17e, second straight conductive rod; 17f, second straight contact tube; and 17g, eccentric contact tube.

In FIG. 4A: 11d, arc motion output shaft which is a lower extending shaft 11b of a feeder panel in a welding torch of the present invention; 15a, first locking nut; $L_0$, extension and retraction adjustable length; $L_1$, length of inner threaded hole of first locking nut 15a; $L_2$, length of un-threaded hole of first locking nut 15a; $L_3$, length of inner threaded hole in lower end of arc motion output shaft 11d; $L_4$, length of un-threaded hole in lower end of arc motion output shaft 11d; and $L_e$, shortest engaging thread length between first extendable and retractable conductive rod or the first extendable and retractable contact tube in the conductive rod mechanism 17 and the arc motion output shaft 11d. In FIG. 4B and FIG. 4C: 11e, directional shaft sleeve; 15b, connecting nut; 15c, T-shaped adjusting nut; 15d, second locking nut; $L_5$, length of inner threaded hole of second locking nut 15d; and $L_2$, length of un-threaded hole of second locking nut 15d.

FIG. 5A is a schematic diagram showing narrow gap welding, and FIG. 5B is a schematic diagram showing narrow groove welding. In FIG. 5A: 26, narrow gap groove; 28, sleeve-shaped nozzle mechanism; $h_0$, filler metal height of last-layer weld; $h_1$, height of nozzle, $h_2$, height of welding torch; and $h_3$, extending length of conductive rod mechanism 17. In FIG. 5B, 27, V-shaped narrow groove.

6A and 6B are schematic diagrams showing arc swing/rotating work of a welding torch of the present invention, where In FIG. 6A: $L_i$, current vertical length of conductive rod mechanism 17; and R, arc rotating radius. In FIG. 6B: 29a, left edge of welding groove; 29b, right edge of welding groove; O, projection point of center line 1 of welding torch; $L_c$, chord length of arc circular-arc-shaped swing trajectory 18; $R_{i-1}$, last arc swing radius during welding of last-layer weld; R, current arc swing radius during welding of current weld to be welded; $\alpha_i$ current arc swing angle during welding of current weld to be welded; and $a_{i-1}$, last arc swing angle during welding of last-layer weld.

In FIG. 7A: 9a, mounting hole; 9b, convex shoulder; 9c, upper lug boss; and 9d, lower convex extension. In FIG. 7B: 9f, small hole of step-shaped center hole; 9g, large hole of step-shaped center hole, namely positioning hole of pressing spring 6. In FIG. 7C: 9h, via of first connecting screw 22a; 9i, via of second connecting screw 22b; 9j, via of third connecting screw 22c; 9k, via of fourth connecting screw 22d; and 9m, via of connecting cable 7a.

In FIG. 9A: 14a, annular gas chamber; 14b, first longitudinal gas passage; 14c, second longitudinal gas passage; 14d, first transverse gas passage; and 14e, second transverse gas passage. In FIG. 9B: 14f, longitudinal water inlet passage; 14g, longitudinal water outlet passage; 14h, 14i, 14j and 14k, first to fourth transverse water passages.

DETAILED DESCRIPTION OF THE EMBODIMENTS

The present invention is further explained in detail below in connection with the drawings and specific embodiments, but the protection scope of the present invention is not limited to the following embodiments. All technical solutions obtained by equivalent substitutions or equivalent variations fall within the protection scope of the present invention.

Figure 1:
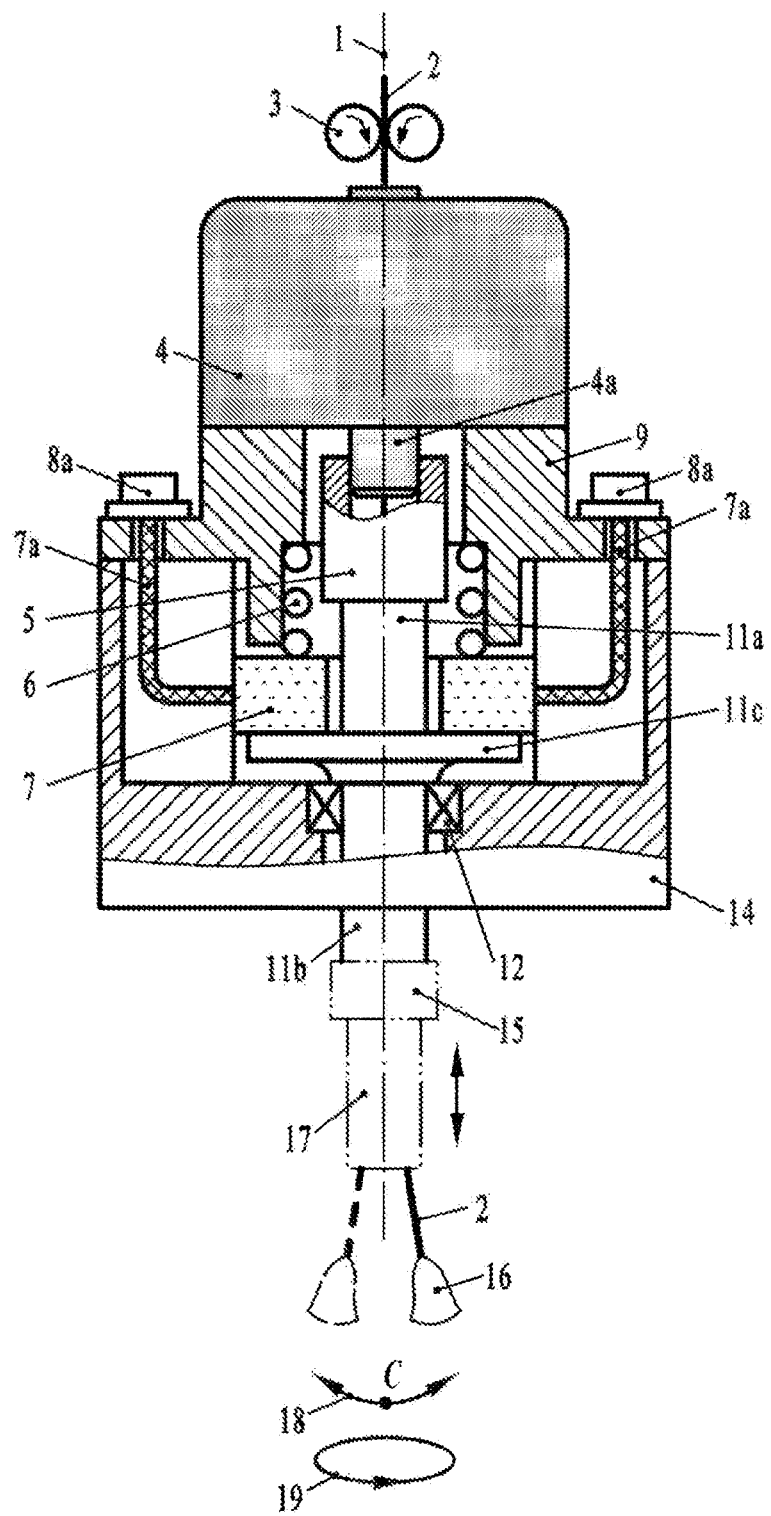
FIG. 1 is a structural schematic diagram of a welding torch in Embodiment 1 of a swing/rotating arc gas metal arc welding torch of the present invention. In the figure: 1, center line of welding torch; 2, welding wire; 3, wire feeder; 4, hollow shaft motor; 4a, lower extending shaft of hollow shaft motor 4; 5, coupling; 6, pressing spring; 7, electric brush; 7a, connecting cable; 8a, cable fastener; 9, motor base; 11a, upper extending shaft of feeder panel; 11b, lower extending shaft of the feeder panel; 11c, flange table of feeder panel; 12, support bearing; 14, electric brush base; 15, connector mechanism; 16, arc; 17, conductive rod mechanism; 18, arc circular-arc-shaped swing trajectory; 19, arc rotating motion trajectory; and C, arc swing midpoint.

Embodiment 1 of welding torch: FIG. 1 is a structural schematic diagram of a welding torch in embodiment 1 of a swing/rotating arc gas metal arc welding torch of the present invention. The welding torch includes an arc motion mechanism, a motor base 9, an electric brush base 14, a nozzle mechanism (not shown), and an electric brush mechanism consisting of an electric brush 7 and a pressing spring 6 thereof. The arc motion mechanism includes a drive mechanism and a transmission mechanism. The drive mechanism includes a hollow shaft motor 4 and a lower extending shaft 4a thereof. The transmission mechanism includes a coupling 5, a feeder panel and a conductive rod mechanism 17, and the feeder panel is a cylindrical body with an upper extending shaft 11a and a lower extending shaft 11b, and a flange table 11c in middle. The electric brush 7 includes an electric brush body and a connecting cable 7a thereof. The lower extending shaft 11b of the feeder panel serves as an arc motion output shaft, and the electric brush base 14 also serves as a bearing seat of a support bearing 12. The welding torch cooperates with a controller for use, and the controller is electrically connected to the hollow shaft motor 4, so that control functions such as motor motion control, arc swing/rotating frequency detection, arc swing midpoint positioning control, arc swing/rotating process parameter setting and display are achieved.

As shown in FIG. 1, the hollow shaft motor 4 is fixedly mounted on the motor base 9, and the motor base 9 is fixedly connected to the upper end surface of the electric brush base 14 through connecting screws by means of convex shoulders at the two sides of the middle. The fixed connection between the motor base 9 and the electric brush base 14 is preferably mechanical connection by connecting screws, for example, a first connecting screw 22a, a second connecting screw 22b, a third connecting screw 22c, and a fourth connecting screw 22d (see FIG. 2C). The lower extending shaft 4a of the hollow shaft motor 4 is fixedly connected to the upper extending shaft 11a of the feeder panel that penetrates through the brush 7 and then the pressing spring 6 by means of the coupling 5 in the motor base 9. The lower extending shaft 11b of the feeder panel penetrates through the support bearing 12 on the bottom of the electric brush base 14 and then is connected to the upper end of the conductive rod mechanism 17 by means of a connector mechanism 15 or directly. The electric brush 7 is mounted in a cross positioning slot in the electric brush base 14, and is in tight sliding conductive contact with the upper end surface of the flange table 11c of the feeder panel under action of the pressing spring 6 mounted in a lower-end positioning hole in the motor base 9. The connecting cable 7a of the electric brush 7 is connected to a cable fastener 8a which is fixed on the convex shoulders at the two sides of the middle of the motor base 9. The conductive rod mechanism 17 is modulating or extendable and retractable. The connector mechanism 15 can be a single connector, such as a connecting nut or a locking nut, and also can be a connector mechanism consisting of a plurality of connectors. A welding wire 2 fed out from a wire feeder 3 is obliquely fed out from an inner hole of an eccentric or curved conductive rod mechanism 17 after penetrating through the inner through holes of the hollow shaft of the hollow shaft motor 4, the coupling 5, and the upper extending shaft 11a and the lower extending shaft 11b of the feeder panel.

The hollow shaft motor 4 adopts a step motor, a direct-current motor or a servo motor, and can be a motor with single-shaft extension or double-shaft extension. When the servo motor is used, the hollow shaft motor 4 needs to be electrically insulated from the welding wire 2, the motor base 9 and the upper extending shaft 11a of the feeder panel. To cool the welding torch and make the structure of the welding torch compact, a welding shielding gas passage and a welding torch cooling water passage may be arranged in a wall of the electric brush base 14, so that a welding shielding gas and cooling water are respectively introduced into the built-in gas passage and the built-in cooling water passage from the inner through holes of the connecting screws. The construction form and the structural parameters of the conductive rod mechanism 17 are modulating, the length of the conductive rod mechanism is modulating (i.e., stepped adjustment) or is extension and retraction adjustable (i.e., continuous adjustment), and modulation on the construction form, the structural parameters and the length may be performed at the same time and also may be separately performed to meet application needs of different welding process methods, workpieces with different plate thicknesses, welding grooves of different forms, welds of different layers and nozzle mechanisms of different forms.

Figure 2A:
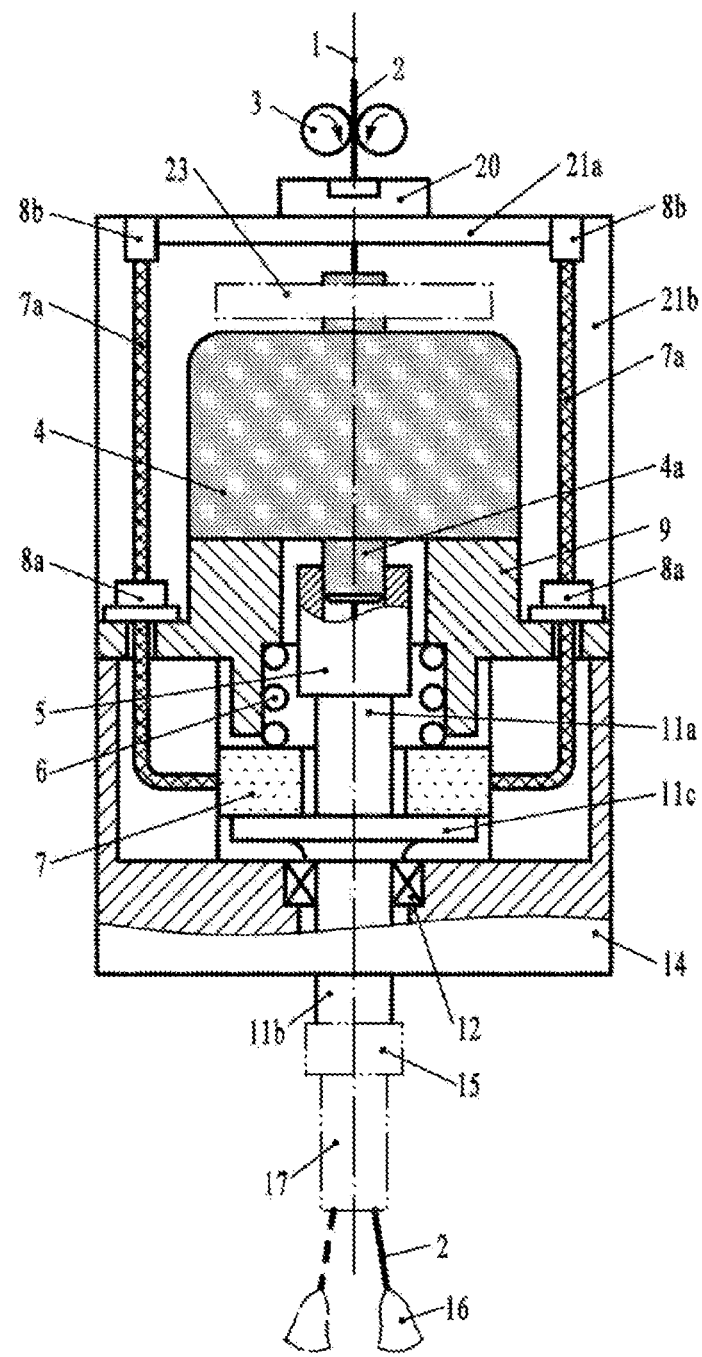
FIG. 2A is a structural front view of a welding torch in Embodiment 2 and Embodiment 3 of a swing/rotating arc gas metal arc welding torch of the present invention.
Figure 2B:
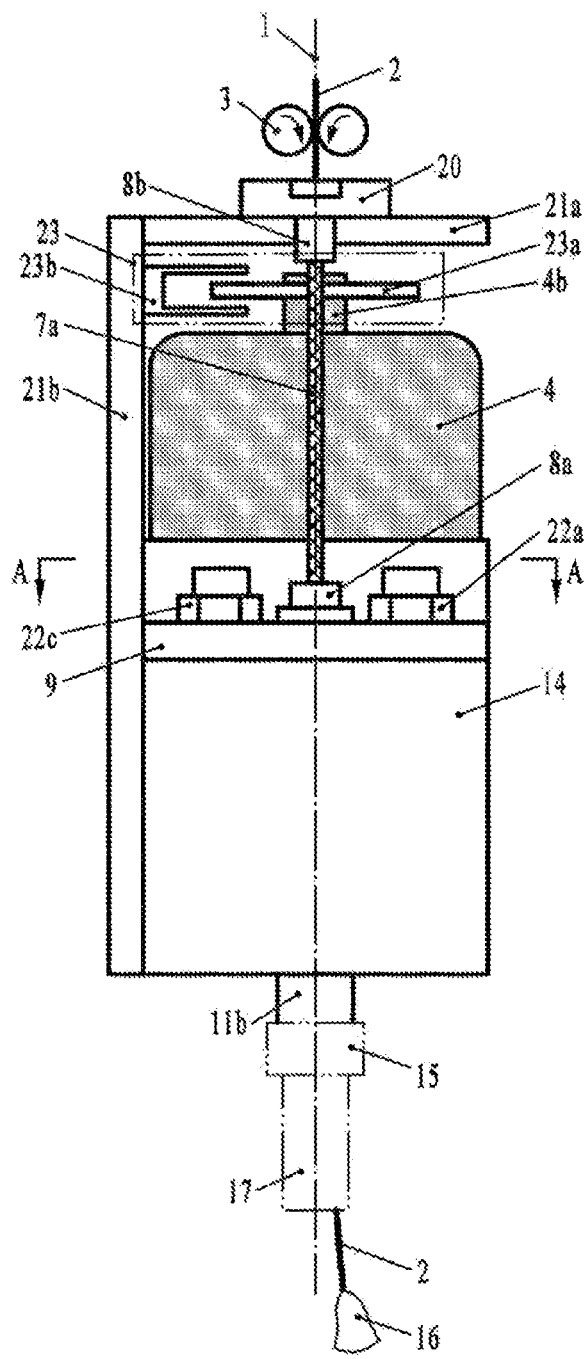
FIG. 2B is a left side view of the welding torch as shown in FIG. 2A.
Figure 2C:
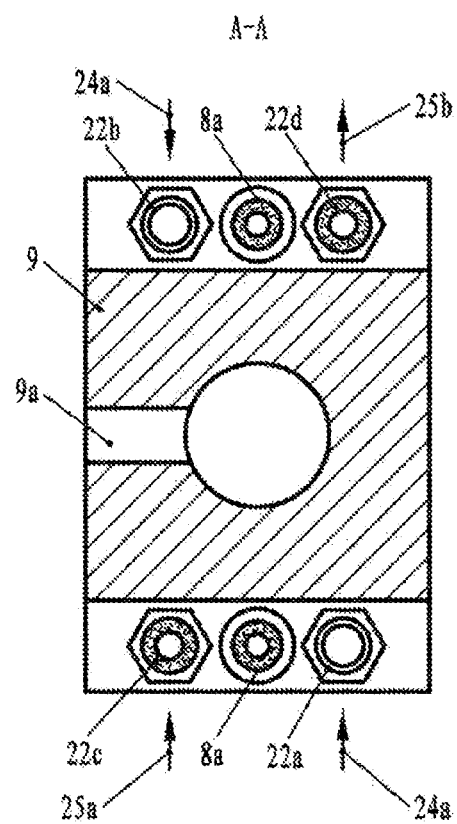
FIG. 2C is a cross-sectional view of a structure connected to a motor base 9 at position A-A in FIG. 2B.

FIG. 2A is a structural front view of a welding torch in Embodiment 2 and Embodiment 3 of a swing/rotating arc gas metal arc welding torch of the present invention; FIG. 2B is a left side view of the welding torch as shown in FIG. 2A; and FIG. 2C is a cross-sectional view of a structure connected to a motor base 9 at position A-A in FIG. 2B.

Embodiment 2 of welding torch: on the basis of the embodiment 1 as shown in FIG. 1, a supporting frame is added to provide a supporting clamp for the welding torch in Embodiment 1, as shown in FIG. 2A and FIG. 2B. The supporting frame consists of a top plate 21a and a side plate 21b, and is preferably an integrated single-piece inverted-L-shaped structure as shown in FIG. 2B, where the top plate 21a serves as a base plate of a welding torch coupling head. Correspondingly, the lower side of the side plate 21b of the supporting frame is fixedly connected to the electric brush base 14; a welding torch coupling head 20 is mounted on the upper end surface of the top plate 21a of the supporting frame, and cable connecting heads 8b are fixedly connected on the two side surfaces or the upper end surface, so that connecting cables 7a at the two sides of the electric brush 7 pass through a cable fastener 8a and then are connected to the cable connecting heads 8b. A welding wire 2 fed out from a wire feeder 3 passes through the inner holes of the welding torch coupling head 20 and the top plate 21a of the supporting frame, and then is fed into the hollow shaft of the hollow shaft motor 4.

Embodiment 3 of welding torch: on the basis of the embodiment 2 of the welding torch, a hollow shaft motor 4 with double-shaft extension is adopted, and a photoelectric switch device 23 for detecting an arc swing/rotating frequency and an arc swing midpoint C is arranged on an upper extending shaft 4b of the motor. As shown in FIG. 2A and FIG. 2B, the device is composed of an external grating disc 23a and an optical coupler 23b, and may be further covered with a dustproof cover (not shown). The optical coupler 23b and the dustproof cover are fixedly connected to the supporting frame. In this case, the hollow shaft motor 4 is preferably a step motor or a direct-current motor.

No sensing device for detecting the arc swing/rotating frequency and the arc swing midpoint is specially arranged in Embodiment 1 and Embodiment 2 of the welding torch or the photoelectric switch device 23 is arranged on an upper extending shaft 4b of the double-shaft extension hollow shaft motor 4 in Embodiment 3 of the welding torch, so that a motor base 9 of the hollow shaft motor 4 can be fixedly connected to a support bearing seat (namely, the electric brush base 14) of a rotating shaft (namely, the lower extending shaft 11b of the feeder panel) directly. In this manner, direct positioning between a drive mechanism and a transmission mechanism of the welding torch is achieved, transmission positioning precision is remarkably improved, rotating resistance of the hollow shaft motor 4 is reduced, and working reliability is improved. Meanwhile, the length of the upper extending shaft 11a of the feeder panel is further effectively shortened, so that the structure of the welding torch is more compact and simplified, and the practicability of the welding torch of the present invention is improved.

Embodiment of a use method of the welding torch: a single-shaft extension server hollow motor 4 with a built-in photoelectric encoder is adopted, or a double-shaft extension hollow shaft motor 4 with the photoelectric switch device 23 on an upper extending shaft 4b of the motor is adopted, or a single-shaft extension non-servo hollow shaft motor 4 is adopted, as a drive motor for swing/rotating arc. A welding cable is connected to a cable fastener 8a or a welding torch coupling head 20 or a cable connecting head 8b. After a conductive rod mechanism 17 is adjusted to a proper length through a modulation or extension and retraction adjusting method, a welding wire 2 fed out from a wire feeder 3 is made to penetrate through the welding torch coupling head 20, a top plate 21a of a supporting frame, the hollow shaft of the hollow shaft motor 4, a coupling 5, and an upper extending shaft 11a and a lower extending shaft 11b of the feeder panel, and then is obliquely fed out from an inner hole of a contact tube at the lower end of an eccentric or curved conductive rod mechanism 17. Arc swing/rotating process parameters are set by means of a controller of the welding torch, where arc swing/rotating frequency is adjusted and set by an arc swing/rotating frequency detection method based on sensing of a built-in photoelectric encoder or a photoelectric switch device 23 or an arc swing/rotating frequency calibration method based on detection of an auxiliary speed measuring device such as a speed meter. The welding shielding gas (for example, argon gas, $CO_2$, an argon-rich gas mixture and the like) passes through the built-in gas passage of the welding torch body and/or a connecting port of the external gas passage of the nozzle mechanism, and then flows into an external nozzle mechanism of the welding torch body to provide gas shielding for a welding arc area. Welding current flows through the cable fastener 8a, or the welding torch coupling head 20 and the top plate 21a of the supporting frame, or the cable connecting head 8b, penetrates through the connecting cable 7a, the electric brush 7, a flange table 11c and the lower extending shaft 11b of the feeder panel, and the conductive rod mechanism 17 and then is guided into a welding arc 16, achieving welding feeding without cable winding. Then, the hollow shaft motor 4 directly drives the upper extending shaft 11a and the lower extending shaft 11b of the feeder panel by means of the coupling 5 to drive the arc 16 on the end part of the welding wire 2 to perform unidirectional (anticlockwise or clockwise) rotating motion 19 with a certain radius around the center line 1 of the welding torch relative to the welding torch according to the swing/rotating process parameters set before welding or perform reciprocating circular-arc-shaped swing 18 with a certain radius around the swing midpoint C. Meanwhile, a drag system moves the welding torch or the workpiece with a certain speed to realize swing/rotating gas metal gas welding. In the welding process, the controller of the welding torch can detect and display the swing/rotating frequency of the arc in real time by means of the photoelectric switch device 23 or the built-in photoelectric encoder of the servo hollow shaft motor 4.

During swing arc welding, the welding wire 2 needs to bend to the front or the rear of the welding direction in a manual mode or an automatic control mode before welding, so that positioning of the arc swing midpoint C before welding is achieved. In the automatic control mode, the controller of the welding torch detects an angle position signal of rotation of the motor in real time by means of the photoelectric switch device 23 which is sleeved on the upper extending shaft 4*b* of the hollow shaft motor 4 or a built-in absolute photoelectric encoder of the servo hollow shaft motor 4, and guides the hollow shaft motor 4 to rotate the conductive rod mechanism 17, so that the welding wire 2 is bent to the front or the rear of the welding direction, thereby achieving the control function of automatically finding the swing midpoint C before welding. In addition, the arc swing process parameters include arc swing frequency, a swing angle, retention time at the two sides and a swing radius, and the arc rotating process parameters include arc rotating frequency and rotating radius, and these parameters can be adjusted respectively; for example, the arc rotating frequency is 0-100 Hz, the arc swing frequency is 0-15 Hz, the arc swing angle is 0-360°, the retention time of the arc at the two sides of the welding groove (the retention time at the two sides for short) is each 0-800 ms, and the arc swing or rotating radius is set according to the needs of the welding process.

The welding torch of the present invention has swing/rotating arc welding functions and is suitable for solid and flux-cored wire welding, where the welding shielding gas may not be used when applied to welding of the self-shielded flux-cored wire. When the conductive rod mechanisms 17 and the welding shielding gas nozzles of different forms are selected, the welding torch is useful for narrow gap or non-narrow gap gas metal arc welding. In an expanded use for submerged arc welding, a built-in gas passage and a cooling water passage are not arranged in the wall of the electric brush base 14, or the built-in gas passage and the cooling water passage may not be used. Therefore, the process adaptability is strong and the scope of application is wide.

In summary, the use method of the welding torch of the present invention includes the following steps:

(1) adopting the single-shaft extension hollow shaft motor 4 or the double-shaft extension hollow shaft motor 4 with the photoelectric switch device 23 on the upper extending shaft 4*b* of the motor as the drive motor of the swing/rotating arc welding torch, and obliquely feeding out the welding wire 2 from the inner hole of the contact tube at the lower end of the eccentric or curved conductive rod mechanism 17 after adjusting the conductive rod mechanism 17 to a proper length by the conductive rod mechanism modulation method or the extension and retraction adjusting method of the welding torch or directly selecting the conductive rod mechanism 17 with a proper length;

(2) setting the arc swing/rotating process parameters by means of the controller of the welding torch, where the arc swing/rotating frequency is adjusted by the arc swing/rotating frequency detection method based on sensing of the built-in photoelectric encoder of the single-shaft extension servo hollow shaft motor 4 or the external photoelectric switch device 23 of the double-shaft extension hollow shaft motor 4 or the arc swing/rotating frequency calibration method based on detection of the speed meter; during swing arc welding, automatically bending the welding wire 2 to the front or the rear of the welding direction by the arc swing midpoint detection method based on sensing of the built-in photoelectric encoder or the photoelectric switch device 23; and (3) providing the welding shielding gas to the external nozzle mechanism of the welding torch body through the built-in gas passage of the welding torch body and/or the external gas passage of the nozzle mechanism; rotating by the drive motor the lower extending shaft 11*b* of the feeder panel which serves as the arc motion output shaft, to drive the arc 16 on the end part of the welding wire 2 which is obliquely fed out from in the welding torch conductive rod mechanism 17 to perform unidirectional rotating motion 19 around the center line 1 of the welding torch or reciprocating circular-arc-shaped swing 18, and detecting and displaying the arc swing/rotating frequency according to the arc swing/rotating frequency detection method, thereby achieving swing/rotating gas metal arc welding.

Embodiments of Modulating Conductive Rod Mechanism

Figure 3A:
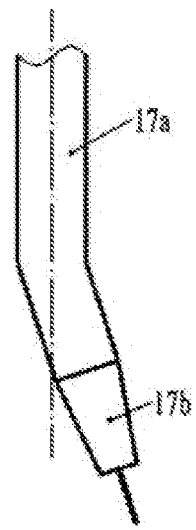
FIGS. 3A to 3D are structural diagrams of a construction form of a conductive rod mechanism 17.
Figure 3B:
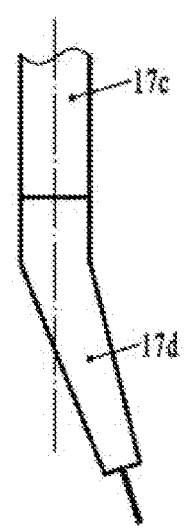
Figure 3C:
Figure 3D:
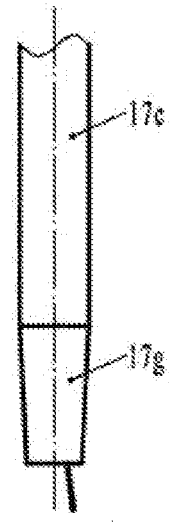

Embodiment 1 of modulating conductive rod mechanism 17: as shown in FIGS. 3A to 3D, according to a construction modulation solution of the conductive rod mechanism 17, the conductive rod mechanism 17 is composed of a conductive rod and a contact tube, and preferably adopts the following four construction forms: a bent conductive rod 17*a* is connected to a first straight contact tube 17*b* to form a bent conductive rod type curved conductive rod mechanism as shown in FIG. 3A; or a first straight conductive rod 17*c* is connected to a bent contact tube 17*d* to form a bent contact tube type curved conductive rod mechanism as shown in FIG. 3B; or a second straight conductive rod 17*e* is obliquely connected to a second straight contact tube 17*f* to form an oblique contact tube type curved conductive rod mechanism as shown in FIG. 3C; or a first straight conductive rod 17*c* is connected to an eccentric contact tube 17*g* to form an eccentric conductive rod mechanism as shown in FIG. 3D. The conductive rod is preferably connected to a lower extending shaft 11*b* of the feeder panel by means of a connector mechanism 15 (for example, a connecting nut), which is suitable for a narrow gap or narrowing groove arc welding occasion or an application occasion that needs a lengthened conductive rod mechanism for arc welding.

Embodiment 2 of modulating conductive rod mechanism 17: as shown in FIG. 1 and FIGS. 3A to 3D, according to a construction modulation solution of the conductive rod mechanism 17, the upper end of the conductive rod mechanism 17 is directly integrated with a lower extending shaft 11*b* of a feeder panel without a connector mechanism 15, and in this case, the conductive rod mechanism 17 is directly composed of the lower part of the lower extending shaft 11*b* of the feeder panel which serves as an arc motion output shaft, and a contact tube. A first straight lower part of the lower extending shaft 11*b* of the feeder panel is connected to an eccentric contact tube 17*g* to form an eccentric conductive rod mechanism, or the first straight lower part of the lower extending shaft 11*b* of the feeder panel is connected to a bent contact tube 17*d* to form a bent contact tube type curved conductive rod mechanism, or a second straight lower part of the lower extending shaft 11*b* of the feeder panel is obliquely connected to a second straight contact tube 17*f* to form an oblique contact tube type curved conductive rod mechanism, or a bent lower part of the lower extending shaft 11*b* of the feeder panel is connected to a first straight contact tube 17*b* to form a bent conductive rod type curved conductive rod mechanism. The first straight lower part corresponds to a first straight conductive rod 17*c*, the second straight lower part corresponds to a second straight conductive rod 17*e*, and the bent lower part corresponds to a bent conductive rod 17a. When the lower extending shaft 11b with a proper length of the feeder panel is selected, the modulating conductive rod mechanism can be used for a narrow gap or non-narrow gap arc welding occasion.

For the modulating conductive rod mechanism 17, the curved conductive rod mechanism is preferable in application occasions with a greater arc swing/rotating radius, for example, narrow gap welding with a greater groove gap, and built-up welding and cosmetic welding, where it is preferred to implement the bent conductive rod type curved conductive rod mechanism with low cost. In a swing or rotating arc welding occasion with a smaller groove gap, for example, narrow gap welding or narrow groove welding with a groove gap below 10 mm, the eccentric conductive rod mechanism can be selected. In a variable-groove welding occasion with a varying groove width or groove angle, the bent conductive rod type curved conductive rod mechanism is preferable for swing arc welding. In a large-thickness plate welding application occasion, when it is necessary to use a longer conductive rod mechanism, the eccentric or curved conductive rod mechanism in Embodiment 1 is preferable. In an occasion adopting an external sleeve-shaped nozzle mechanism 28 for narrow gap or narrow groove multi-layer welding, the bent contact tube type curved conductive rod mechanism is preferable during rotating arc welding in order to conveniently modulate the length of the conductive rod mechanism by replacing a contact tube, and the bent conductive rod type curved conductive rod mechanism or the eccentric conductive rod mechanism is preferable during swing arc welding. By modulating the construction and the length of the conductive rod mechanism 17 as well as structural parameters thereof (for example, length of each section, a curving angle and an eccentric distance), it can adapt to different welding application needs.

Figure 4A:
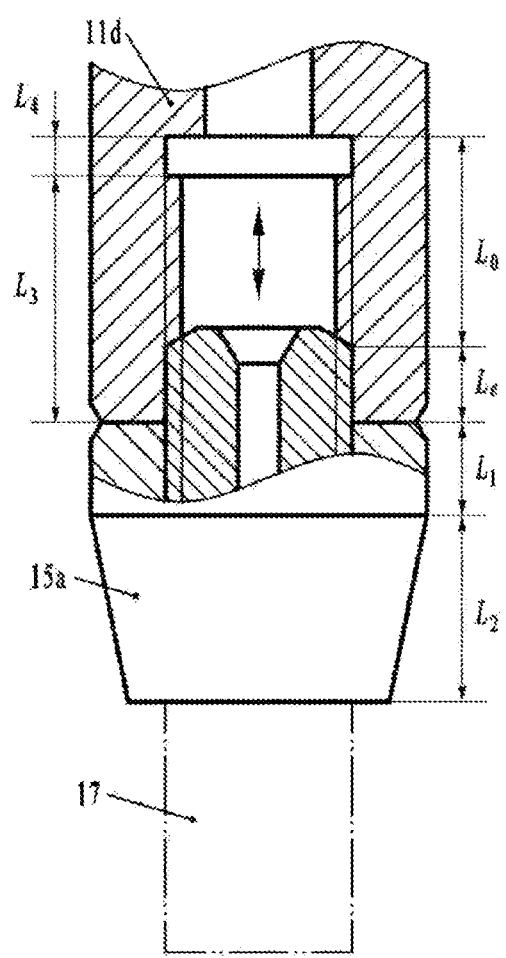
FIG. 4A is a structural schematic diagram of Embodiment 1 of a conductive rod mechanism extension and retraction adjusting device.

Embodiments of Extendable and Retractable Conductive Rod Mechanism and Extension and Retraction Adjusting Device Thereof Embodiment 1 of extendable and retractable conductive rod mechanism 17 and extension and retraction adjusting device thereof: the extendable and retractable conductive rod mechanism 17 is composed of a first extendable and retractable conductive rod with outer threads on the upper part and a contact tube connected to the lower end of the first extendable and retractable conductive rod, or is directly composed of a first extendable and retractable contact tube with outer threads on the upper part. The extension and retraction adjusting device of the conductive rod mechanism 17 consists of the extendable and retractable conductive rod mechanism 17, and a first locking nut 15a and an arc motion output shaft 11d, as shown in FIG. 4A.

The first extendable and retractable conductive rod is a bent conductive rod 17a connected to a first straight contact tube 17b or a first straight conductive rod 17c connected to a bent contact tube 17d or an eccentric contact tube 17g or a second straight conductive rod 17e obliquely connected to a second straight contact tube 17f, and the first extendable and retractable contact tube is a bent contact tube 17d or an eccentric contact tube 17g, as shown in FIGS. 3A to 3D. The upper end of the first extendable and retractable conductive rod or the first extendable and retractable contact tube in the extendable and retractable conductive rod mechanism 17 is screwed into a center hole in the lower part of the arc motion output shaft 11d in a relative extendable and retractable threaded connection mode, and a first locking nut 15a is screwed on outer threads of the first extendable and retractable conductive rod or the first extendable and retractable contact tube, so that the first locking nut 15a is in locking connection with the lower end surface of the arc motion output shaft 11d. The small diameters of the outer threads may be smaller than or greater than the outer diameter of an un-threaded section of the first extendable and retractable conductive rod or the first extendable and retractable contact tube. When the small diameters of the outer threads are smaller than the outer diameter of the un-threaded section, after the first locking nut 15a is screwed in from the upper end of the outer threaded section, the upper end of the outer threaded section is screwed into a center hole in the lower part of the arc motion output shaft 11d. The extension and retraction adjusting device is suitable for the welding torch of the present invention, and is also suitable for other swing/rotating arc welding torches with similar functions. In the welding torch of the present invention, the arc motion output shaft 11d is a lower extending shaft 11b of the feeder panel, and the first locking nut 15a is one form of a connector mechanism 15 as shown in FIG. 1.

In the embodiment 1 of the extendable and retractable conductive rod mechanism 17 and the extension and retraction adjusting device thereof, preferably, an inner through hole of the first locking nut 15a sequentially includes an inner threaded hole with a length of $L_1$ and an un-threaded hole with a length of $L_2$ from top to bottom, and the center hole in the lower part of the arc motion output shaft 11d sequentially includes an inner threaded hole with a length of $L_3$ and an un-threaded hole with a length of $L_4$ from bottom to top. The length $L_1$ of the inner threaded hole is a thread engaging length between the first locking nut 15a and the first extendable and retractable conductive rod or the first extendable and retractable contact tube. The length $L_2$ of the un-threaded hole is not smaller than an extension and retraction adjustable length $L_0$ of the first extendable and retractable conductive rod or the first extendable and retractable contact tube, namely, $L_2 \geq L_0$, so that the un-threaded hole in the first locking nut 15a can cover the lower section of the outer threaded section of the first extendable and retractable conductive rod or the first extendable and retractable contact tube to protect the outer threads when a lower extension length of the first extendable and retractable conductive rod or the first extendable and retractable contact tube reaches the maximum value; preferably, $(L_3+L_4)$ is equal to $(L_e+L_0)$, where $L_e$ is a shortest thread engaging length between the first extendable and retractable conductive rod or the first extendable and retractable contact tube and the arc motion output shaft 11d. The length of the outer threaded section of the first extendable and retractable conductive rod or the first extendable and retractable contact tube is not smaller than $(L_1+L_e+L_0)$, where for $L_0=L_2$, whether extending-out length of the first extendable and retractable conductive rod or the first extendable and retractable contact tube reaches the limit or not can be determined by judging whether the lower end of the outer threaded section is just exposed out of the lower end of the first locking nut 15a.

Embodiment 2 of extendable and retractable conductive rod mechanism 17 and extension and retraction adjusting device thereof: the extendable and retractable conductive rod mechanism 17 is composed of a second extendable and retractable conductive rod with outer threads on the upper part and a contact tube connected to the lower end thereof or is directly composed of a second extendable and retractable contact tube with outer threads on the upper part, where the outer threaded section is a flat cylindrical body with a waist-shaped cross section, and threads are arranged on the circular-arc surface of the flat cylindrical body. The extension and retraction adjusting device of the conductive rod mechanism consists of the extendable and retractable conductive rod mechanism 17, a connector mechanism 15, a directional shaft sleeve 11e and an arc motion output shaft 11d. The connector mechanism 15 consists of a connecting nut 15b, a T-shaped adjusting nut 15c and a second locking nut 15d. The directional shaft sleeve 11e is a cylindrical or a stepped cylindrical shaft sleeve with a waist-shaped through hole in the longitudinal direction, preferably a stepped cylindrical (i.e., T-shaped) shaft sleeve, and is fixedly arranged in a center hole in the lower part of the arc motion output shaft 11d for guiding the flat upper part of the second extendable and retractable conductive rod or the second extendable and retractable contact tube, so that the extendable and retractable conductive rod mechanism 17 is fixedly connected to the arc motion output shaft 11d in relatively fixed and consistent circumferential positions, as shown in FIG. 4A and FIG. 4C.

The second extendable and retractable conductive rod is a bent conductive rod 17a connected to a first straight contact tube 17b or a first straight conductive rod 17c connected to a bent contact tube 17d or an eccentric contact tube 17g or a second straight conductive rod 17e obliquely connected to a second straight contact tube 17f, and the second extendable and retractable contact tube is a bent contact tube 17d or an eccentric contact tube 17g, as shown in FIGS. 3A to 3D. The upper section of the outer threaded section of the second extendable and retractable conductive rod or the second extendable and retractable contact tube can be inserted into a waist-shaped through hole of the directional shaft sleeve 11e in an extendable and retractable sliding mode, a T-shaped adjusting nut 15c and a second locking nut 15d are screwed on the lower section of the outer threaded section from top to bottom in sequence. A connecting nut 15b is sleeved on the T-shaped adjusting nut 15c from the lower end and then is connected to the outer threads on the lower part of the arc motion output shaft 11d. The lower end surface of a flanging flange at the top end of the T-shaped adjusting nut 15c is pressed by inner convex shoulders at the lower end of the connecting nut 15b, so that the upper end surface of the flanging flange at the top end of the T-shaped adjusting nut 15c and the lower end surface of the arc motion output shaft 11d are in a pressing state. The second locking nut 15d is tightly screwed, so that the upper end surface of the second locking nut 15d and the lower end surface of the T-shaped adjusting nut 15c are in locking connection. The small diameters of the outer threads can be smaller than or greater than the outer diameter of an un-threaded section of the second extendable and retractable conductive rod or the second extendable and retractable contact tube. The extension and retraction adjusting device is suitable for the welding torch of the present invention, and is also suitable for other swing/rotating arc welding torches with similar functions. In the welding torch of the present invention, the arc motion output shaft 11d is a lower extending shaft 11b of the feeder panel.

In the Embodiment 2 of the extendable and retractable conductive rod mechanism 17 and the extension and retraction adjusting device thereof, an inner through hole of the second locking nut 15d sequentially includes an inner threaded hole with a length of $L_5$ and an un-threaded hole with a length of $L_6$ from top to bottom. The center hole in the lower part of the arc motion output shaft 11d is an un-threaded hole with a length of $L_0$. Preferably, the length $L_6$ of the un-threaded hole is not smaller than the extension and retraction adjustable length $L_0$ of the second extendable and retractable conductive rod or the second extendable and retractable contact tube, namely, $L_6 \geq L_0$, so that the un-threaded hole in the second locking nut 15d can cover the lower section of the outer threaded section of the second extendable and retractable conductive rod or the second extendable and retractable contact tube to protect the outer threads when the lower extending-out length of the second extendable and retractable conductive rod or the second extendable and retractable contact tube reaches the maximum value. For $L_6 = L_0$, whether the extending-out length of the second extendable and retractable conductive rod or the second extendable and retractable contact tube reaches the limit or not can be determined by judging whether the lower end of the outer threaded section is just exposed out of the lower end of the second locking nut 15d or not.

Figure 5A:
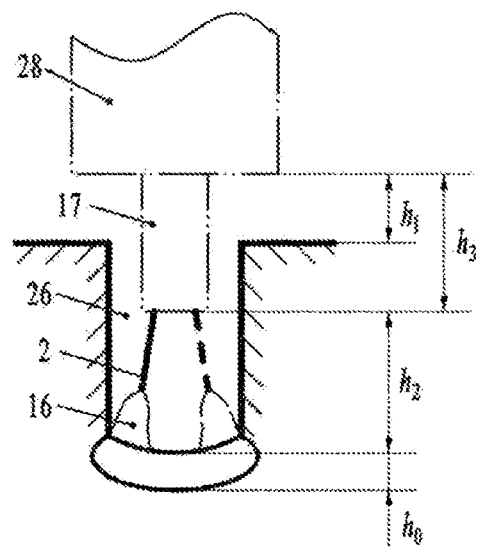
FIGS. 5A and 5B are schematic diagrams showing a positional relationship between a conductive rod mechanism 17 and a sleeve-shaped nozzle mechanism and a welding groove during narrow gap or narrow groove welding, where
Figure 5B:
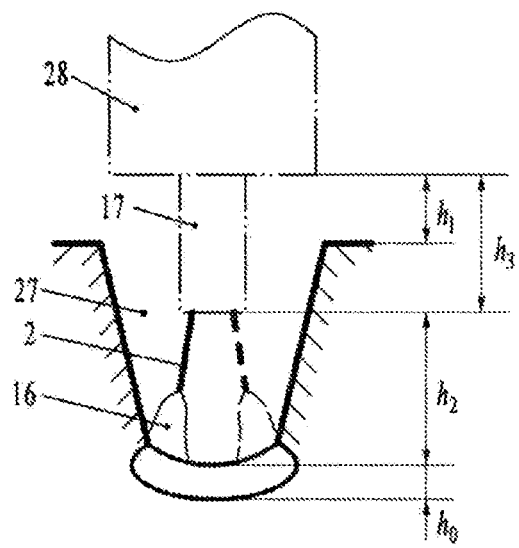

In Embodiment 1 and Embodiment 2 of the extendable and retractable conductive rod mechanism 17 and the extension and retraction adjusting device thereof, with respect to the value of the extension and retraction adjustable length $L_0$, for example, during narrow gap or narrow groove multi-layer welding as shown in FIG. 5A and FIG. 5B, by setting the nozzle height, $h_1 = 5$ mm, the welding torch height, $h_2 = 18$ mm and the smallest extending-out length of the end part of the conductive rod mechanism 17 outside the sleeve-shaped nozzle mechanism 28, $h_{3min} = 0$, when the largest depth of a narrow gap groove 26 or a V-shaped narrow groove 27 to be welded suitable for the external sleeve-shaped nozzle mechanism 28 is 30 mm, the extension and retraction adjustable length $L_0 \geq 17$ mm.

Embodiments of Extension and Retraction Adjusting Method of Conductive Rod Mechanism Embodiment 1 of extension and retraction adjusting method of conductive rod mechanism: an extension and retraction adjustable method of a conductive rod mechanism for a swing/rotating gas metal arc welding torch, as shown in FIG. 4A, includes the following steps:

(1) loosening a first locking nut 15a which is in thread pair connection with a first extendable and retractable conductive rod or a first extendable and retractable contact tube in the extendable and retractable conductive rod mechanism 17, so that the upper end surface of the first locking nut 15a is disengaged from the lower end surface of an arc motion output shaft 11d of the welding torch to be in an unlocking state; (2) rotating the first extendable and retractable conductive rod or the first extendable and retractable contact tube, so that the upper end of the first extendable and retractable conductive rod or the first extendable and retractable contact tube which is screwed in a threaded connection mode retracts upwards or extends downwards in a center hole of the arc motion output shaft 11d; and (3) reversely rotating the first locking nut 15a, so that the upper end surface of the first locking nut 15a and the lower end surface of the arc motion output shaft 11d are in a locking state, thereby achieving extendable and retractable adjustment on the length of the conductive rod mechanism 17.

The extendable and retractable conductive rod mechanism 17 is composed of the first extendable and retractable conductive rod with outer threads on the upper part and the contact tube connected to the lower end of the first extendable and retractable conductive rod or is directly composed of the first extendable and retractable contact tube with outer threads on the upper part. The first extendable and retractable conductive rod is a bent conductive rod 17a connected to a first straight contact tube 17b or a first straight conductive rod 17c connected to a bent contact tube 17d or an eccentric contact tube 17g or a second straight conductive rod 17e obliquely connected to a second straight contact tube 17f The first extendable and retractable contact tube is the bent contact tube 17d or the eccentric contact tube 17g, as shown in FIGS. 3A to 3D. When an external sleeve-shaped nozzle mechanism 28 is used for narrow gap or narrow groove multi-layer welding, each inward retraction adjusting amount of the first extendable and retractable conductive rod or the first extendable and retractable contact tube is approximately equal to a filler metal height $h_0$ of a later-layer weld, as shown in FIGS. 5A and 5B.

Figure 4B:
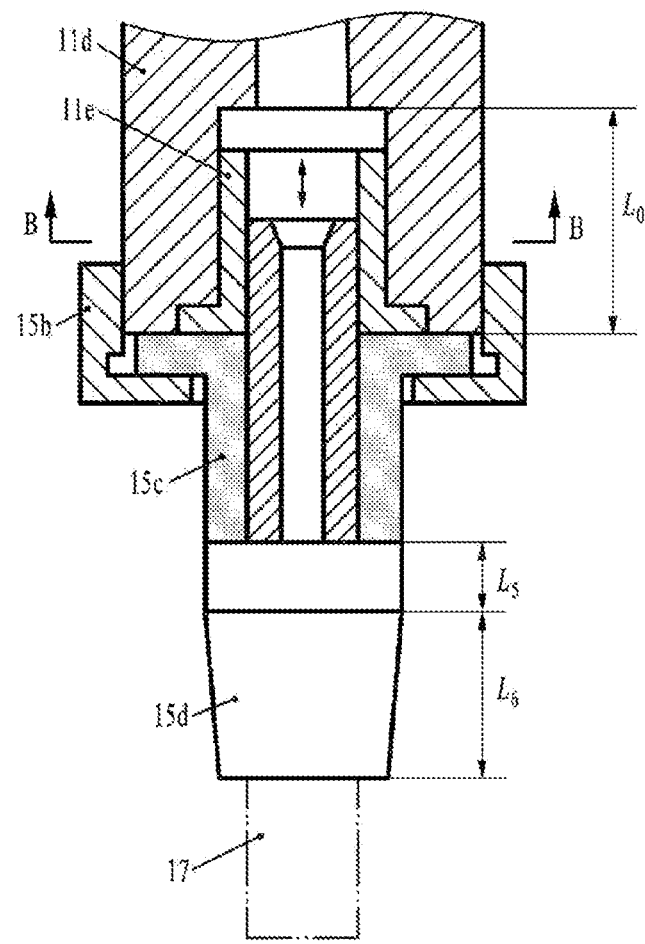
FIG. 4B is a structural schematic diagram of Embodiment 2 of a conductive rod mechanism extension and retraction adjusting device.
Figure 4C:
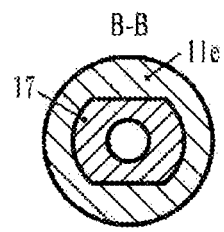
FIG. 4C is a cross-sectional view of a structure connected to a conductive rod mechanism 17 at position B-B in FIG. 4B.

Embodiment 2 of extension and retraction adjusting method of conductive rod mechanism: an extension and retraction adjustable method of a conductive rod mechanism for a swing/rotating gas metal arc welding torch, as shown in FIG. 4B and FIG. 4C, includes the following steps:

(1) adjusting preparation: loosening a second locking nut 15d which is in thread pair connection with outer threads on the upper part of a second extendable and retractable conductive rod or a second extendable and retractable contact tube in the conductive rod mechanism 17, so that the upper end surface of the second locking nut 15d is disengaged from the lower end surface of a T-shaped adjusting nut 15c which is also screwed on the outer threaded section to be in an unlocking state; loosening a connecting nut 15b which is in thread pair connection with the outer threads on the lower part of an arc motion output shaft 11d of the welding torch, so that the upper end of the T-shaped adjusting nut 15c which is mated in the connecting nut 15b is disengaged from the lower end surface of the arc motion output shaft 11d; (2) adjusting implementation: rotating the T-shaped adjusting nut 15c, so that the flat upper end of the second extendable and retractable conductive rod or the second extendable and retractable contact tube which is inserted in a sliding mode retracts upwards or extends downwards in a waist-shaped through hole of a cylindrical or step-shaped cylindrical directional shaft sleeve 11e fixed in the center hole in the lower part of the arc motion output shaft 11d; where when an external sleeve-shaped nozzle mechanism 28 is used for narrow gap or narrow groove multi-layer welding, each inward retraction adjusting amount of the second extendable and retractable conductive rod or the second extendable and retractable contact tube approximately equal to a filler metal height $h_0$ of a last-layer weld; and (3) adjusting ending: reversely rotating and tightly screwing the connecting nut 15b and pressing the lower end surface of a flanging flange at the top end of the T-shaped adjusting nut 15c by inner convex shoulders at the lower end of the connecting nut 15b, so that the upper end surface of the T-shaped adjusting nut 15c and the lower end surface of the arc motion output shaft 11d are in the pressing state; and then reversely rotating the second locking nut 15d, so that the upper end surface of the second locking nut 15d and the lower end surface of the T-shaped adjusting nut 15c are in the locking state, thereby achieving extendable and retractable adjustment on the length of the conductive rod mechanism 17.

The extendable and retractable conductive rod mechanism 17 is composed of the second extendable and retractable conductive rod with outer threads on the upper part and the contact tube connected to the lower end of the second extendable and retractable conductive rod, or is directly composed of the second extendable and retractable contact tube with outer threads on the upper part, where the outer threaded section is a flat cylinder with a waist-shaped cross section. The second extendable and retractable conductive rod is a bent conductive rod 17a connected to a first straight contact tube 17b or a first straight conductive rod 17c connected to a bent contact tube 17d or an eccentric contact tube 17g, or a second straight conductive rod 17e obliquely connected to a second straight contact tube 17f. The second extendable and retractable contact tube is the bent contact tube 17d or the eccentric contact tube 17g, as shown in FIGS. 3A to 3D.

Embodiment of Conductive Rod Mechanism Modulation Method

Embodiment of conductive rod mechanism modulation method: when an external sleeve-shaped nozzle mechanism 28 is adopted for narrow gap or narrow groove multi-layer welding, as shown in FIGS. 5A and 5B, modulation of the conductive rod mechanism includes modulation on construction of a conductive rod mechanism or length of the conductive rod mechanism. The conductive rod mechanism modulation method includes the following steps:

(1) selecting construction of the conductive rod mechanism: a bent conductive rod 17a is connected to a first straight contact tube 17b, or a first straight conductive rod 17c is connected to a bent contact tube 17d or an eccentric contact tube 17g or a second straight conductive rod 17e is obliquely connected to a second straight contact tube 17f to form a modulating eccentric or curved conductive rod mechanism 17, as shown in FIGS. 3A to 3D; or directly, a first straight lower part of the arc motion output shaft is connected to a bent contact tube 17d or an eccentric contact tube 17g, or a second straight lower part of the arc motion output shaft is obliquely connected to a second straight contact tube 17f, or a bent lower part of the arc motion output shaft is connected to a first straight contact tube 17b, to form a modulating eccentric or curved conductive rod mechanism 17. The arc motion output shaft in the welding torch of the present invention is a lower extending shaft 11b of the feeder panel, the first straight lower part corresponds to the first straight conductive rod 17c, the second straight lower part corresponds to a second straight conductive rod 17e, and the bent lower part corresponds to a bent conductive rod 17a.

(2) selecting the length of the conductive rod or the contact tube: by setting L as a current vertical length of the conductive rod mechanism 17 during welding of current weld to be welded, and as a last vertical length of the conductive rod mechanism during welding of last-layer weld, the conductive rod or contact tube is replaced with a shorter conductive rod or contact tube based on the adjusting principle of $L_i=(L_{i-1}-h_0)$ according to a filler metal height $h_0$ of the last-layer weld every time welding of one layer of the weld is completed, so as to keep a height $h_2$ (for example, $h_2$=15-25 mm) of the welding torch at a constant value when a nozzle height $h_1$ (for example, $h_1$=1-5 mm) of the sleeve-shaped nozzle mechanism 28 is kept constant.

Figure 6A:
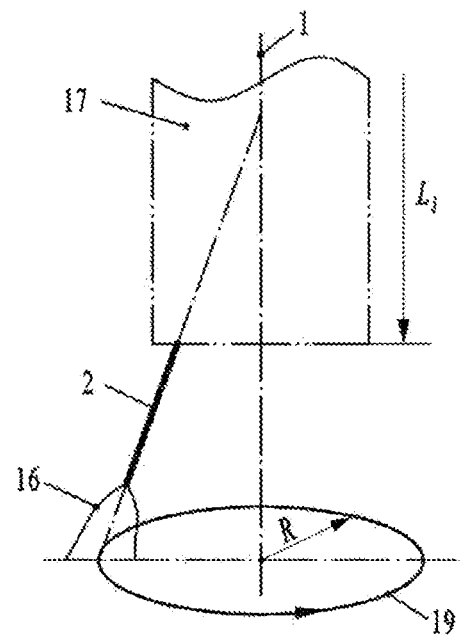
FIG. 6A is a schematic diagram showing arc rotating work.
Figure 6B:
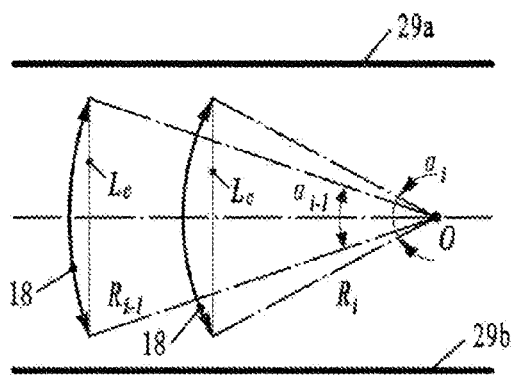
FIG. 6B is a schematic diagram showing arc swing work.

(3) selecting an arc swing angle or an adjusting way for a length of the conductive rod mechanism for rotating arc welding:

during rotating arc welding, as shown in FIG. 6A, a welding wire 2 is obliquely fed out from the conductive rod mechanism 17, an arc 16 performs unidirectional rotating motion 19 with a certain radius relative to the welding torch, where an arc rotating radius R needs to be kept constant so as to obtain uniform and consistent multi-layer weld forming effect; correspondingly, it is necessary to selectively use the adjusting way for the length of the conductive rod or the contact tube in the step (2), that is, adjustment on the length of the conductive rod or the contact tube is achieved by shortening the length of a vertical section of the bent conductive rod or the straight conductive rod or the bent contact tube;

during swing arc welding, as shown in FIG. 6B, by setting $R_i$ and $a_i$, as a current arc swing radius and a current arc swing angle during welding of the current weld to be welded, $R_{i-1}$ and $a_{i-1}$ as a last arc swing radius and a last arc swing angle during welding of the last-layer weld, and O as a projection point of a center line 1 of the welding torch, in order to keep a chord length $L_c$, of an arc circular-arc-shaped swing trajectory 18 constant so that distances when the arc swings to the nearest positions to a left edge 29a and a right edge 29b of the welding groove are equal, the arc swing angle is correspondingly increased or reduced to $\alpha_i$ to achieve adjustment on the arc swing angle according to the adjusting principle of $\sin(a_1/2)=(R_{i-1}/R_i)\cdot\sin(a_{i-1}/2)$ based on arc swing radius decrease caused by using a shorter straight contact tube 17b or 17f or arc swing radius increase caused by using a shorter eccentric contact tube 17g; or during swing arc welding, the arc swing angle is kept unchanged after the bent contact tube 17d or the conductive rod 17a or 17c or 17e with a shorter vertical section is used.

(4) conditionally ending the modulation process: the modulation process of the steps (2) and (3) is stopped once the lower end part of the conductive rod mechanism 17 is retracted into or nearly retracted into a sleeve-shaped nozzle mechanism 28, for example, when the extending-out length of the end part of the conductive rod mechanism outside the sleeve-shaped nozzle mechanism 28 is $h_3=-2$ mm~+3 mm; and the welding torch is lifted as a whole, so that each lifting amount of the welding torch position is approximately equal to the filler metal height $h_0$ of the last-layer weld, so as to keep the height $h_2$ of the welding torch constant until subsequent welding is accomplished. When the extending-out length $h_3$ is a negative value, it is indicated that the end part of the conductive rod mechanism has been retracted into the sleeve-shaped nozzle mechanism 28.

Embodiments of Motor Base 9 and Electric Brush Base 14

Figure 7A:
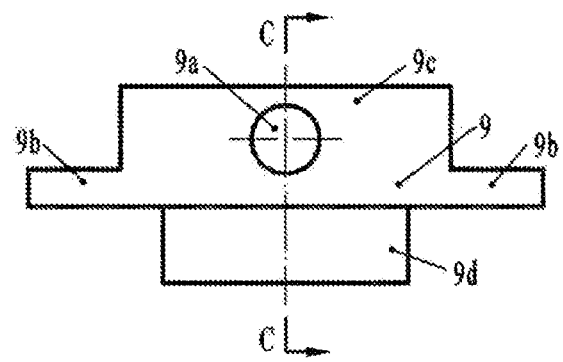
FIG. 7A is a front view of a motor base 9.
Figure 7B:
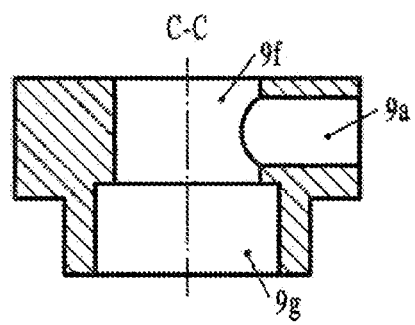
FIG. 7B is a cross-sectional view at position C-C in FIG. 7A.
Figure 7C:
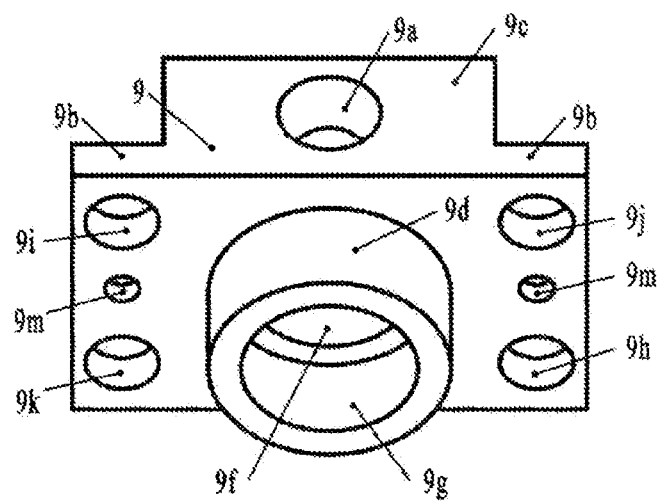
FIG. 7C is a three-dimensional structural schematic diagram of a motor base 9.

Embodiment of motor base 9: a step-shaped center hole which is small in top and large in bottom is formed in a motor base 9 of a hollow shaft motor 4, and the motor base may be cylindrical or T-shaped or cross-shaped in shape, preferably in the shape of a cross cylinder. Embodiment of motor base 9: as shown in FIG. 7A, FIG. 7B and FIG. 7C, FIG. 7A is a front view of the motor base 9; FIG. 7B is a cross-sectional view at position C-C in FIG. 7A; and FIG. 7C is a three-dimensional structural schematic diagram of the motor base 9. The motor base 9 is crossed-shaped, and includes an upper lug boss 9c, a lower convex extension 9d and convex shoulders 9b at the two sides; step-shaped center holes 9f and 9g which are small in tops and large in bottoms are formed in the motor base, the large hole 9g of the step-shaped center holes is positioned in the lower convex extension 9d of the motor base, and a stop end and a hole wall of the large hole 9g provide positioning and guiding effect for a pressing spring 6, as show in FIG. 1, so that the large hole 9g functions as a positioning hole of the pressing spring 6. The upper lug boss 9c of the motor base 9 is used for fixedly mounting a hollow shaft motor 4. Vias 9h-9k of the connecting screws 22a-22d and vias 9m of connecting cables 7a at the two sides of the electric brush base are formed in the convex shoulders 9b at the two sides of the motor base 9, so that the motor base 9 is fixed by means of the connecting screws 22a, 22b, 22c and 22d, and the connecting cables 7a are allowed to penetrate through the motor base 9. A mounting hole 9a for locking/unlocking a coupling 5 is formed in one side of the motor base 9, so that a lower extending shaft 4a of the hollow shaft motor 4 can be fixedly connected to an upper extending shaft 11a of the feeder panel by means of the coupling 5 in the motor base 9, as shown in FIG. 1. The vias 9m further may be C-shaped holes extending to the outer edges of the convex shoulders 9b at the two sides.

Figure 8:
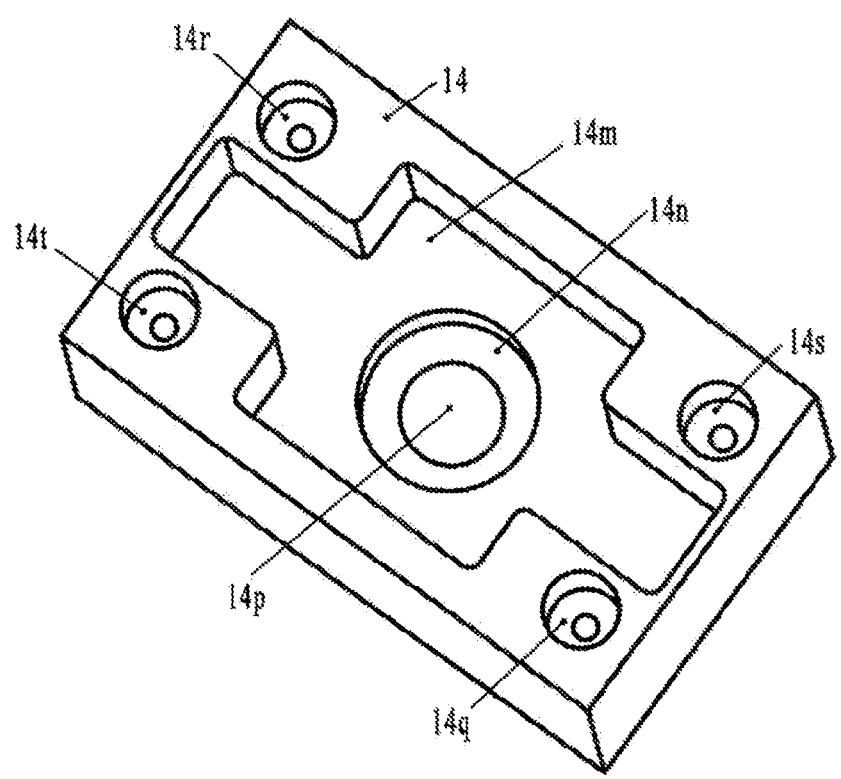
FIG. 8 is a three-dimensional structural schematic diagram of an embodiment of an electric brush base 14. In the figure: 14q, screw hole 14q of third connecting screw 22c; 14r, screw hole of fourth connecting screw 22d; 14s, screw hole of first connecting screw 22a; 14t, screw hole of second connecting screw 22b; 14m, cross counterbore, namely positioning slot of electric brush 7; 14n, large center hole of electric brush base 14; and 14p, small center hole of electric brush base 14.

Embodiment 1 of electric brush base 14: as shown in FIG. 8, a screw hole 14s of a first connecting screw 22a, a screw hole 14t of a second connecting screw 22b, a screw hole 14q of a third connecting screw 22c and a screw hole 14r of a fourth connecting screw 22d are formed in four corner parts of the electric brush base 14, so that the upper end of the electric brush base 14 is fixedly connected to the convex shoulders 9b at the two sides of the motor base 9 by means of the connecting screws 22a, 22b, 22c and 22d. A cross counterbore 14m and a center hole which is large in top and small in bottom are sequentially formed in the middle of the electric brush base 14 longitudinally from top to bottom. The large center hole 14n is used for mounting a support bearing 12, and the small center hole 14p is a hole for the lower extending shaft 11b of the feeder panel to pass through. The cross counterbore 14m serves as a positioning slot of the electric brush 7 for positioning the electric brush 7, so that the electric brush 7 only can slide up and down along the hole wall of the cross counterbore 14m, as shown in FIG. 1.

Embodiment 2 of electric brush base 14: a welding shielding gas passage and/or a cooling water passage further may be arranged in the wall of an electric brush base 14, so that a welding shielding gas flows into an external nozzle mechanism through the built-in gas passage. The built-in gas passage includes a longitudinal gas passage, a transverse gas passage and an annular gas chamber, and also may include only a transverse gas passage and an annular gas chamber. The longitudinal gas passage and the transverse gas passage may be composed of one or more gas passages respectively, and preferably, the built-in passage includes two longitudinal gas passages and two transverse gas passages.

Figure 9A:
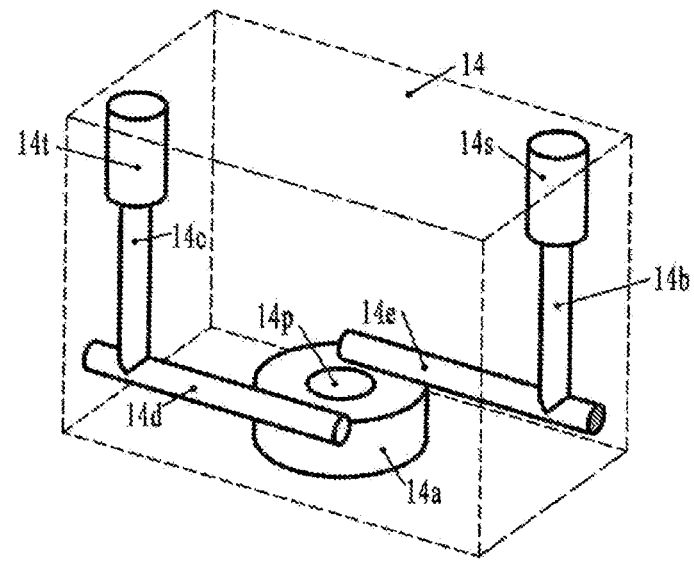
FIG. 9A is a schematic diagram showing spatial arrangement of a built-in gas passage.

Embodiments of Built-In Gas Passage and Cooling Water Passage as Well as Use Method Thereof Embodiment of built-in gas passage: the built-in gas passage is preferably a symmetrical structure with two or more gas passages. As shown in FIG. 9A, the built-in gas passage is arranged in the wall of an electric brush base 14, and includes two longitudinal gas passages 14b and 14c, two transverse gas passages 14d and 14e, and an annular gas chamber 14a. The annular gas chamber 14a is a central counterbore larger than the small center hole 14p, which is upwards formed in the bottom end surface of the electric brush base 14. The two longitudinal gas passages and the two transverse gas passages are symmetrically arranged at diagonally opposite sides of the annular gas chamber 14a, the two longitudinal gas passages 14b and 14c are positioned in the side wall of the electric brush base 14, and the two transverse gas passages 14d and 14e are positioned in the bottom wall of the electric brush base 14.

One end of the first transverse gas passage 14d is connected to the lower end of the second longitudinal gas passage 14c and the other end of the first transverse gas passage is connected to the annular gas chamber 14a. One end of the second transverse gas passage 14e is connected to the lower end of the first longitudinal gas passage 14b, and the other end of the second transverse gas passage is connected to the annular gas chamber 14a. The upper end of the first longitudinal gas passage 14b is connected to a screw hole 14s in a first connecting screw 22a, and the upper end of the second longitudinal gas passage 14c is connected to a screw hole 14t in a second connecting screw 22b. In the first connecting screw 22a and the second connecting screw 22b fixedly connecting the motor base 9 to the electric brush base 14, referring to FIG. 2C and FIG. 10, an inner through hole 22e of the first connecting screw and an inner through hole 22f of the second connecting screw, which serve as welding shielding gas through holes, are respectively formed, the lower ends of the through holes are respectively connected to the first longitudinal gas passage 14b and the second longitudinal gas passage 14c by means of the screw holes 14s and 14t, and the upper ends of the through holes are connected to welding shielding gas 24a by means of quick coupling heads, so that the welding shielding gas 24a is gathered into the annular gas chamber 14a after passing through the inner through holes 22e and 22f of the connecting screws, the longitudinal gas passages 14b and 14c, and the transverse gas passages 14e and 14d, and then flows into a sleeve-shaped nozzle mechanism 28.

Figure 9B:
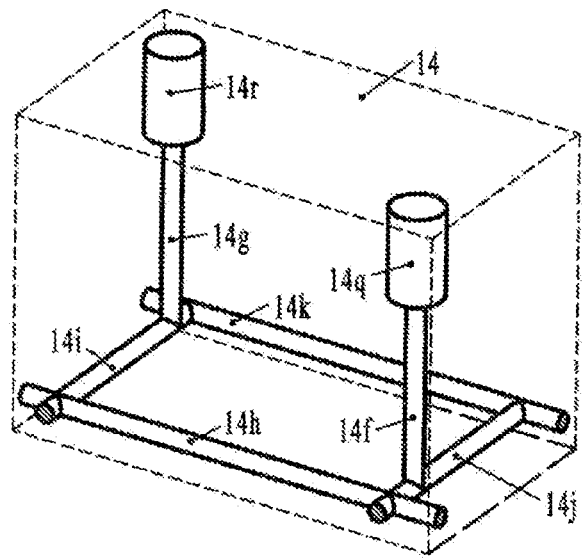
FIG. 9B is a schematic diagram showing spatial arrangement of a built-in cooling water passage.

Embodiment of built-in cooling water passage: the built-in cooling water passage is preferably a loop with a symmetrical structure, and is provided with at least a water inlet passage and a water outlet passage. As shown in FIG. 9B, the built-in cooling water passage is arranged in the wall of an electric brush base 14, and includes a longitudinal water inlet passage 14f and a longitudinal water outlet passage 14g as well as a rectangular transverse water passage consisting of first to fourth transverse water passages 14h, 14i and 14j and 14k, where the rectangular transverse water passages are symmetrically formed in the bottom wall of the electric brush base 14. The longitudinal water inlet passage 14f and the longitudinal water outlet passage 14g are positioned in the side wall of the electric brush base 14 and are symmetrically arranged above the transverse water passages. The upper end of the longitudinal water inlet passage 14f is connected to a screw hole 14q of a third connecting screw (namely, a connecting screw at the water inlet side) 22c, and the lower end of the longitudinal water inlet passage is connected to the third transverse water passage 14j in the rectangular transverse water passage. The upper end of the longitudinal water outlet passage 14g is connected to a screw hole 14r of a fourth connecting screw (namely, a connecting screw at the water outlet side) 22d, and the lower end of the longitudinal water outlet passage is connected to the second transverse water passage 14i in the rectangular transverse water passage. In the third connecting screw 22c and the fourth connecting screw 22d fixedly connecting the motor base 9 to the electric brush base 14, referring to FIG. 2C, cooling water through holes are respectively formed, the lower ends of the through holes are respectively connected to the longitudinal water inlet passage 14f and the longitudinal water outlet passage 14g of cooling water by means of screw holes 14q and 14r, and the upper ends of the through holes are respectively connected to a cooling water leading-in end 25a and a cooling water leading-out end 25b by means of quick coupling heads, so that cooling water flows out from the inner through hole of the fourth connecting screw 22d after passing through the inner through hole of the third connecting screw 22c (namely, the connecting screw at the water inlet side), the longitudinal water inlet passage 14f, the transverse water passages and the longitudinal water outlet passage 14g, so as to form a cooling water circulating loop.

In the embodiment of the built-in gas passage and the built-in cooling water passage, on one hand, the welding shielding gas and the welding torch cooing water are introduced by means of the inner through holes of the connecting screws used for fixed connection without additional mechanisms, so that the welding torch is more compact in structure. On the other hand, by use of the built-in gas passage and the built-in cooling water passage, the electric brush base 14 is subjected to dual cooling effect of the welding shielding gas 24a and the cooling water 25a, so that the practicability is further improved. In addition, required plugs are arranged at outer outlets of the through holes of the transverse gas passages and the transverse water passages, so that an effective built-in gas passage and built-in cooling water passage are formed in the electric brush base 14. Preferably, the transverse water passages 14h and 14i as well as 14j and 14k are arranged below the transverse gas passages 14d and 14e, so that the lower end surface of the electric brush base 14 closest to the arc is more effectively cooled.

Figure 10:
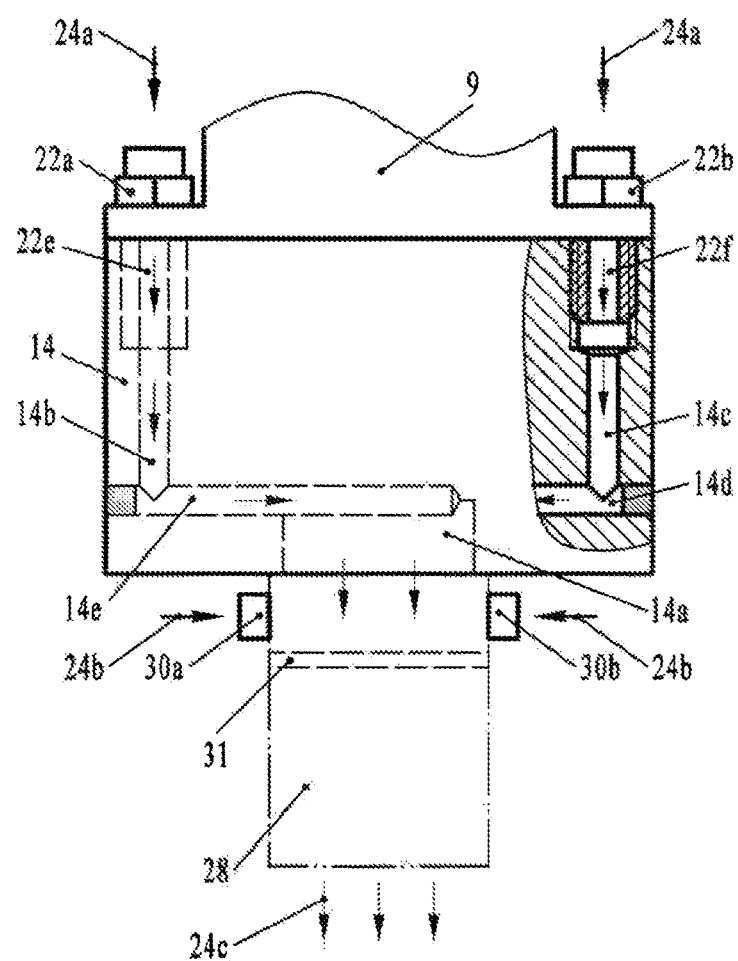
FIG. 10 is a schematic diagram showing a matching relationship between the built-in gas passage and the sleeve-shaped nozzle mechanism according to the present invention. A connecting relationship between the motor base 9 and the electric brush base 14 corresponds to a right view of FIG. 2B; for convenient expression, a schematic diagram showing a connecting relationship of the second transverse gas passage 14e in the transverse gas passage is completely drawn only with a dotted line in the figure. In the figure: 22e, inner through hole of first connecting screw 22a; 22f, inner through hole of second connecting screw 22b; 24b, welding shielding gas connected from outside of the sleeve-shaped nozzle mechanism 28; 24c, welding shielding gas flowing out from sleeve-shaped nozzle mechanism 28; 30a, first connecting port of external gas passage of nozzle mechanism; 30b, second connecting port of external gas passage of nozzle mechanism; and 31, gas sifter.

Embodiment of use method of built-in gas passage: a welding shielding gas 24c is provided for a welding area through the built-in gas passage of the welding torch body and/or the external gas passage of the external nozzle mechanism. Four gas supply ways are preferable: a first gas supply way is a gas supply way through the built-in gas passage; as shown in FIG. 2C, FIG. 9A and FIG. 10, a welding shielding gas 24a is connected from the inner through hole 22e of the first connecting screw 22a and the inner through hole 22f of the second connecting screw 22b, and a welding shielding gas 24c is also provided for a welding area through the longitudinal gas passages 14b and 14c, the transverse gas passages 14e and 14d, the annular gas chamber 14a and a sleeve-shaped nozzle mechanism 28. A second gas supply way is a gas supply way through an external gas passage of the sleeve-shaped nozzle mechanism; as shown in FIG. 10, a welding shielding gas 24b is allowed to directly flow into the external sleeve-shaped nozzle mechanism 28 through a first connecting port 30a and a second connecting port 30b of the external gas passage of the nozzle mechanism, so that a welding shielding gas 24c is provided for the welding area; in this case, the built-in gas passage in the electric brush base 14 may not be provided or used. A third gas supply way is a combined gas supply way through the built-in gas passage and the external gas passage of the nozzle mechanism; as shown in FIG. 10, a welding shielding gas 24c is provided for the welding area in a combined mode through the first gas supply way and the second gas supply way, so that the third gas supply way is suitable for a narrow gap welding with a large gas flow or a welding occasion with a large current. According to a fourth gas supply way, gas is independently supplied by means of an external bias type flat-shaped nozzle mechanism (not shown) of the welding torch body, which is composed of two flat-shaped nozzles at the two sides of a conductive rod, so as to provide gas shielding for a welding arc area in a narrow gap groove, thus being suitable for a narrow gap welding occasion.

The annular gas chamber 14a functions to gather the gas flow, and a space formed between the annular gas chamber 14a and a gas sifter 31 in the sleeve-shaped nozzle mechanism 28 further serves as a gas calming chamber. The gas sifter 31 is arranged in the sleeve-shaped nozzle mechanism 28, so that the welding shielding gas connected from the built-in gas passage of the welding torch body and/or the external gas passage of the nozzle mechanism, is rectified by means of the gas sifter 31, and then flows out from the nozzle mechanism. When the sleeve-shaped nozzle mechanism 28 is used for narrow gap deep weld welding, a flat-shaped structure capable of extending into a narrow gap welding groove is adopted.

Embodiments of Arc Swing/Rotating Frequency Detection and Calibration Methods

Swing/rotating frequency of an arc is identified/detected by means of a pre-calibration way or a built-in photoelectric encoder in a servo motor when a single-shaft extension hollow shaft motor 4 only with a lower extending shaft 4a is adopted. In this case, no additional sensing device for detecting the arc swing/rotating frequency and the arc swing midpoint is not arranged in the welding torch, so that the structure of the welding torch is greatly simplified, as shown in FIG. 1. When a double-shaft extension hollow shaft motor 4 with an upper extending shaft 4b and an lower extending shaft 4a is adopted, as shown in FIG. 2A and FIG. 2B, detection on the arc swing/rotating frequency and the arc swing midpoint can be achieved by means of a photoelectric switch device 23 which is sleeved on the upper extending shaft 4b of the motor, and in this case, the double-shaft extension hollow shaft motor 4 is preferably a step motor or a direct-current motor. The arc swing/rotating frequency detection and calibration methods are described below for an occasion without the additional sensing device or with the built-in photoelectric encoder:

Embodiment of arc swing/rotating frequency calibration method: when no additional sensing device for arc swing/rotating frequency detection is arranged in the arc motion mechanism, before welding, a corresponding relation between an arc swing/rotating frequency and a rotating speed control amount of the hollow shaft motor 4 is established previously in a controller of the welding torch by means of an auxiliary speed measuring device, for example, a tachymeter, so that pre-calibration on the arc swing/rotating frequency is achieved. During welding, the controller makes a welding arc 16 swing or rotate at a set frequency according to the calibrated value. Specifically, the arc swing frequency calibration method includes the following steps:

(1) within a set value range of an arc swing angle, slowly rotating (for example, manually rotating) a speed measuring wheel or a speed measuring rod of a universal electromagnetic or a photoelectric switch type tachymeter in a left-right reciprocating mode, during which a sound or light prompt is given once by the meter every time the speed measuring switch in the meter works, detecting a circumferential position of the speed measuring switch in the speed measurer using the sound/light prompt function of the meter and positioning the speed measuring switch within a rotating angle range covered by the arc swing angle, and then observing the number of times of work k of the speed measuring switch in a complete reciprocating rotating process;

(2) pressing the speed measuring wheel or the speed measuring rod against the side surface or the bottom end surface of the arc motion output shaft of the welding torch, so that the speed measuring switch is positioned within the rotating angle range covered by the arc swing angle; and setting, by the controller of the welding torch, the arc swing angle and the retention time at the two sides, and then adjusting a rotating speed control amount of the drive motor, so that the drive motor rotates the arc motion output shaft and drives the speed measuring wheel or the speed measuring rod to synchronously rotate in a reciprocating mode; and (3) detecting a reciprocating rotating frequency of the arc motion output shaft, and taking the current motor rotating speed control amount as a set value or a calibrated value in the controller of the arc swing frequency when the rotating frequency reading on the meter reaches k times the expected value of the arc swing frequency, thereby achieving calibration on the arc swing frequency.

The number of times of work k of the speed measuring switch in step (1) actually reflects a ratio of the reading value of the meter to the actual value of the swing frequency, and correspondingly, the operation in step (1) can be replaced with the following method: calibrating the swing frequency of the meter previously by means of an existing swing arc welding torch with a real-time arc swing frequency detection function or the swing arc welding torch of the present invention adopting the photoelectric switch device 23, so as to determine a ratio k of the reading value of the meter to the actual value of the swing frequency, where k is a positive integer not smaller than 1.

Embodiment of arc swing frequency detection method: before or during swing arc welding, in a process that a welding wire 2 or an arc 16 performs left and right symmetrical circular-arc-shaped swing 18 around a swing midpoint C, a servo motor driver detects a motor rotating angle position in real time after a motor rotating angle position electric signal output by a built-in photoelectric encoder of a single-shaft extension servo hollow shaft motor 4 is decoded. According to a left side or right side positioning accomplishing pulse electric signal generated by the servo motor driver when the motor rotates to the left side or right side limit position, a controller of the welding torch detects the elapsed time $t_1$ that the motor rotates to the limit positions for every successive three times or rotates to the limit position at the same side for every successive two times. For example, the spent time $t_1$ of the motor from when the motor just rotates to the left side limit position to when the motor rotates to the right side limit position from the left side limit position after staying at the left side and just rotates back to the left side limit position after staying at the right side is detected, and during this detection, the motor rotates to the limit positions for three times (twice at the left side and once at the right side) and rotates to the left side limit position for two times, so that real-time detection on arc swing frequency $f_1$ is achieved, where $f_1$ is equal to $1/t_1$.

In the exemplified one complete swing period, the controller of the welding torch can detect electric signals of a left side positioning accomplishing pulse, a right side positioning accomplishing pulse and a left side positioning accomplishing pulse output by the servo motor driver in sequence, whereby calculation of the swing time $t_1$ and real-time detection of the arc swing frequency $f_1$ can be completed. When the arc swing frequency detection method cooperates with the arc swing midpoint detection method for use, the built-in photoelectric encoder is preferably an absolute photoelectric encoder.

Embodiment of arc rotating frequency detection method: before or during rotating arc welding, in a process that a welding wire 2 before welding or an arc 16 during welding performs unidirectional rotating motion 19 at a certain radius around a center line 1 of the welding torch, a servo motor driver detects a motor rotating angle position in real time after a motor rotating angle position electric signal output by a built-in photoelectric encoder of the single-shaft extension servo hollow shaft motor 4 is decoded, and according to a positioning accomplishing pulse electric signal for one revolution of the motor that is sent by the servo motor driver, a controller of the welding torch detect a time interval $t_2$ between two adjacent positioning accomplishing pulses, to realize real-time detection of arc rotating frequency $f_2$, where $f_2$ is equal to $1/t_2$.

The servo motor driver has an integrated function of position signal decoding, motor power driving, rotating position feedback and control and the like, and can adopts a commercially available standard type matched with the servo motor, similarly hereinafter. The detection method of the arc swing frequency/rotating frequency is also suitable for other welding torches with similar swing arc/rotating arc functions.

Embodiment of Arc Swing Midpoint Detection Method

Figure 11:
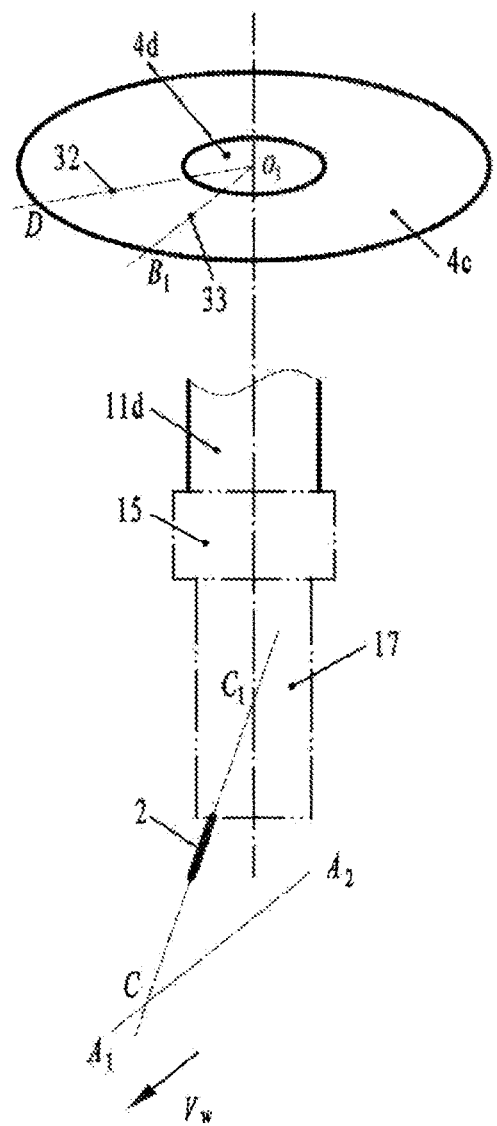
FIG. 11 is a schematic diagram showing a detection method of an arc swing midpoint C. In the figure: 4c, built-in grating disc; 4d, center hole of built-in grating disc 4c; 32, initial rotating position of motor; 33, rotating midpoint position of motor; 01D, initial rotating position line of motor; $O_1B_1$, rotating midpoint position line of motor; $O_1C_1$, center line 1 of welding torch; $A_1A_2$, line located on the surface of a workpiece to be welded and parallel to the direction of a welding speed $V_w$; and $CC_1$, center line of welding wire 2.

When a single-shaft extension servo hollow shaft motor 4 with a built-in absolute photoelectric encoder is adopted, the principle of the arc swing midpoint detection method is as shown in FIG. 11. In the figure, 4c is a built-in grating disc of the built-in photoelectric encoder, and is sleeved on and fixedly arranged on a motor shaft by means of a center hole 4d thereof; 11d is an arc motion output shaft, which is a lower extending shaft 11b of a feeder panel in the welding torch of the present invention, the lower end of the arc motion output shaft is connected to a conductive rod mechanism 17 by means of a connector mechanism 15, and the upper end of the arc motion output shaft is fixedly connected to a lower extending shaft 4a of the hollow shaft motor 4 by means of a coupler 5, as shown in FIG. 1; a line $O_1C_1$ indicates a center line 1 of the welding torch; a line $A_1A_2$ is located on the surface of a workpiece to be welded and is parallel to the direction of a welding speed $V_w$, and the line $A_1A_2$ represents a center line of a welding groove when the welding torch is aligned to the center of a weld; a line $CC_1$ is a center line of a welding wire 2 obliquely extending out from the conductive rod mechanism 17, and is crossed with the line $A_1A_2$ at a point C and with the line $O_1C_1$ at a point $C_1$; a line $O_1D$ indicates an initial rotating position line of the motor; a line $O_1B_1$ indicates a motor rotating midpoint position line corresponding to the arc swing midpoint C, and is parallel to the line $A_1A_2$ and crossed with the line $O_1C_1$ at point $O_1$.

After the conductive rod mechanism 17 is initially mounted or replaced for the welding torch, the hollow shaft motor 4 rotates the conductive rod mechanism 17 by means of the arc motion output shaft 11d of the welding torch or the conductive rod mechanism 17 is manually rotated. In a process that the conductive rod mechanism 17 starts to rotate from an initial rotating position 32, a motor shaft of the hollow shaft motor 4 drives the built-in grating disc 4c to synchronously rotate. When the welding wire 2 obliquely fed out from the conductive rod mechanism 17 is just bent in the forward (as shown in FIG. 11) or reverse direction of the welding position, the line $A_1A_2$, the line $B_1O_1$, the line $CC_1$ and the line $O_1C_1$ are in the center plane of the welding torch, the crossed point C of the center line $CC_1$ of the welding wire and the line $A_1A_2$ is an arc swing midpoint, and in this case, the current rotating position line $O_1B_1$ of the motor is a motor rotating midpoint position 33. According to a motor rotating angle position electric pulse signal generated after the servo motor driver decodes an output signal of the built-in photoelectric encoder or directly according to a motor rotating angle position electric signal output by the built-in photoelectric encoder, a controller of the welding torch reads an absolute position angle θ of motor rotation at a current position and takes the absolute position angle θ as a motor rotating midpoint position 33 corresponding to an arc swing midpoint C, so that position resetting of the arc swing midpoint C after the conductive rod mechanism 17 is initially mounted or replaced is achieved.

Before each welding, due to the influence of the replacement of the conductive rod or the contact tube, or the influence of other human factors, the welding wire 2 obliquely fed out from the conductive rod mechanism 17 is often not necessarily just bent to the front or the rear the welding direction, and as a result, it is necessary to find the arc swing midpoint C automatically or manually before each welding. When the arc swing midpoint C is found by automatic detection, according to the motor rotating angle position electric pulse signal generated after the servo motor driver decodes the signal output from the built-in photoelectric encoder or directly according to the motor rotating angle position electric signal output from the built-in photoelectric encoder, the controller of the welding torch guides the motor to rotate to the motor rotating midpoint position 33 that is set previously, so that the welding wire 2 obliquely fed out from the eccentric or curved conductive rod mechanism 17 can be automatically bent to the front or the rear of the welding, thereby achieving automatic detection and positioning of the arc swing midpoint C before welding. The detection method is suitable for the welding torch of the present invention, and is also suitable for other welding torches with similar arc swing functions.

In summary, the arc swing midpoint detection method includes the following steps:

(1) when the built-in photoelectric encoder is an absolute photoelectric encoder, rotating the arc motion output shaft 11d of the welding torch, so that the welding wire 2 obliquely fed out from the conductive rod mechanism 17 is bent to the front or the rear of the welding; and according to the motor rotating angle position electric pulse signal generated after the servo motor driver decodes the output signal of the built-in photoelectric encoder or directly according to the motor rotating angle position electric signal output by the built-in photoelectric encoder, recording, by the controller of the welding torch, an absolute position angle θ of motor rotation at a current position and taking the absolute position angle θ as a motor rotating midpoint position 33 corresponding to an arc swing midpoint C, thereby achieving position setting of the arc swing midpoint C after initially mounting or replacing the conductive rod mechanism 17; and (2) before each welding, according to the motor rotating angle position electric pulse signal generated after the servo motor driver decodes the output signal of the built-in photoelectric encoder or directly according to the motor rotating angle position electric signal output by the built-in photoelectric encoder, guiding, by the controller of the welding torch, the motor to rotate to the motor rotating midpoint position 33 corresponding to the absolute position angle θ, so that the welding wire 2 obliquely fed out from the conductive rod mechanism 17 is automatically bent to the front or the rear of the welding direction, thereby achieving automatic detection and positioning before welding of the arc swing midpoint C.

Preferably, when the curved conductive rod mechanism 17 composed of the bent conductive rod 17a and the first straight contact tube 17b or the curved conductive rod mechanism 17 composed of the second straight conductive rod 17e and the second straight contact tube 17f obliquely connected to the second straight conductive rod is adopted, and the conductive rod is fixedly connected to the arc motion output shaft 11d (for example, the lower extending shaft 11b of the feeder panel of the welding torch of the present invention) in fixed and consistent relative positions by means of the connector mechanism 15, the curving direction of the welding wire 2 relative to the arc motion output shaft 11d is always kept unchanged even after each replacement of the conductive rod or the contact tube, and correspondingly, the operation in step (1) is only used during initial mounting and debugging of the conductive rod mechanism 17. Alternatively, preferably, when the curved conductive rod mechanism 17 composed of the bent lower part of the arc motion output shaft 11d and the first straight contact tube 17b or the curved conductive rod mechanism 17 composed of the second straight lower part of the arc motion output shaft 11d and the second straight contact tube 17f obliquely connected to the second straight lower part is adopted, the contact tube and the arc motion output shaft 11d can be always fixedly connected in fixed and consistent relative positions without the connector mechanism 15, and correspondingly, the operation in step (1) is only used during initial mounting and debugging of the conductive rod mechanism 17.

What is claimed is:

1. A swing/rotating gas metal arc welding torch, comprising a hollow shaft motor, a motor base, an electric brush base, a feeder panel, a coupling, a conductive rod mechanism, an electric bush and a pressing spring, wherein the motor base is a cylindrical body with convex shoulders in an outer middle part, a mounting hole for locking the coupling is formed in one side of the motor base, a step-shaped center hole which is small in top and large in bottom is formed in the motor base, and the pressing spring is mounted in a large hole of the step-shaped center hole; a cross counterbore and a center hole which is large in top and small in bottom are sequentially formed in the electric brush base from top to bottom, the electric brush is mounted in the cross counterbore, a support bearing is mounted in a large center hole, and a gas passage and/or cooling water passage is arranged in a wall of the electric brush base; the feeder panel is a cylindrical body with an upper extending shaft and a lower extending shaft, and a flange table in middle, the upper extending shaft of the feeder panel sequentially penetrates through the electric brush and the pressing spring and then is fixedly connected to the lower extending shaft of the hollow shaft motor in the motor base by means of the coupling, so that the electric bush is in tight sliding conductive contact with an upper end surface of the flange table of the feeder panel, and the lower extending shaft of the feeder panel penetrates through the support bearing and a small center hole in a bottom of the electric brush base and then is directly connected to the conductive rod mechanism or connected to the conductive rod mechanism by means of a connector mechanism; the hollow shaft motor is fixedly mounted on an upper end surface of the motor base, the convex shoulders at the two sides of the middle of the motor base are fixedly connected to the upper end of the electric brush base by means of connecting screws, and one ends of connecting cables at the two sides of the electric brush are fixedly connected to the electric brush and another ends of the connecting cables are connected to cable fasteners fixed to the convex shoulders of the motor base; and the conductive rod mechanism is a modulating eccentric conductive rod mechanism or a modulating curved conductive rod mechanism or an extendable and retractable eccentric conductive rod mechanism or an extendable and retractable curved conductive rod mechanism.

2. The swing/rotating gas metal arc welding torch according to claim 1, wherein
the modulating conductive rod mechanism is composed of a conductive rod and a contact tube, wherein a bent conductive rod is connected to a first straight contact tube to form a curved conductive rod mechanism, or a first straight conductive rod is connected to a bent contact tube to form a curved conductive rod mechanism, or a second straight conductive rod is obliquely connected to a second straight contact tube to form a curved conductive rod mechanism, or a first straight conductive rod is connected to an eccentric contact tube to form an eccentric conductive rod mechanism;
alternatively, the modulating conductive rod mechanism is directly composed of the lower extending shaft of the feeder panel and the contact tube, wherein a first straight lower part of the lower extending shaft of the feeder panel is connected to an eccentric contact tube to form an eccentric conductive rod mechanism, or a first straight lower part of the lower extending shaft of the feeder panel is connected to a bent contact tube to form a curved conductive rod mechanism, or a second straight lower part of the lower extending shaft of the feeder panel is obliquely connected to a second straight contact tube to form a curved conductive rod mechanism, or a bent lower part of the lower extending shaft of the feeder panel is connected to a first straight contact tube to form a curved conductive rod mechanism.

3. The swing/rotating gas metal arc welding torch according to claim 2,
wherein the welding torch further comprises an inverted-L-shaped supporting frame consisting of a side plate and a top plate, wherein the lower side of the side plate of the supporting frame is fixedly connected to the electric brush base, and a welding torch coupling head is mounted on the upper end surface of the top plate of the supporting frame, and cable connecting heads are fixedly connected on the two side surfaces of the top plate of the supporting frame, so that a connecting cable of the electric brush passes through a cable fastener and then is connected to the cable connecting heads.

4. The swing/rotating gas metal arc welding torch according to claim 1, wherein
the extendable and retractable conductive rod mechanism is composed of a first extendable and retractable conductive rod with outer threads on the upper part and a contact tube connected to the lower end thereof or is directly composed of a first extendable and retractable contact tube with outer threads on the upper part; the upper section of the outer threaded section of the first extendable and retractable conductive rod or the first extendable and retractable contact tube is screwed into a center hole in the lower part of the lower extending shaft of the feeder panel which serves as the arc motion output shaft in a relative extendable and retractable threaded connection mode, and a first locking nut which serves as a connector mechanism is screwed on the lower section of the outer threaded section thereof, so that the first locking nut is in locking connection with the lower end surface of the lower extending shaft of the feeder panel to form a conductive rod mechanism extension and retraction adjusting device consisting of the extendable and retractable conductive rod mechanism, and the first locking nut and the arc motion output shaft;
alternatively, the extendable and retractable conductive rod mechanism is composed of a second extendable and retractable conductive rod with outer threads on the upper part and a contact tube connected to the lower end thereof or is directly composed of a second extendable and retractable contact tube with outer threads on the upper part, and the outer threaded section thereof is a flat cylindrical body with a waist-shaped cross section; the conductive rod mechanism extension and retraction adjusting device consists of the extendable and retractable conductive rod mechanism, a connector mechanism, a directional shaft sleeve and an arc motion output shaft, and the connector mechanism consists of a connecting nut, a T-shaped adjusting nut and a second locking nut, and the directional shaft sleeve is a cylindrical body or a stepped cylindrical body with a waist-shaped through hole in the longitudinal direction, and is fixedly arranged in the center hole in the lower part of the lower extending shaft of the feeder panel which serves as the arc motion output shaft; the upper section of the outer threaded section of the second extendable and retractable conductive rod or the second extendable and retractable contact tube is inserted into the waist-shaped through hole of the directional shaft sleeve in an extendable and retractable sliding mode, and the T-shaped adjusting nut and the second locking nut are screwed on the lower section of the outer threaded section from top to bottom in sequence, the connecting nut is sleeved on the T-shaped adjusting nut from the lower end and then is connected to the outer threads on the lower part of the lower extending shaft of the feeder panel, and inner convex shoulders at the lower end of the connecting nut press the lower end surface of a flanging flange at the top end of the T-shaped adjusting nut, so that the upper end surface of the T-shaped adjusting nut and the lower end surface of the lower extending shaft of the feeder panel are in a pressing state, and the second locking nut and the lower end surface of the T-shaped adjusting nut are in locking connection;

wherein the first extendable and retractable conductive rod or the second extendable and retractable conductive rod is a bent conductive rod connected to a first straight contact tube or a first straight conductive rod connected to a bent contact tube or an eccentric contact tube or a second straight conductive rod obliquely connected to a second straight contact tube; and the first extendable and retractable contact tube or the second extendable and retractable contact tube is a bent contact tube or an eccentric contact tube.

5. The swing/rotating gas metal arc welding torch according to claim 4, wherein an inner through hole of the first locking nut sequentially comprises an inner threaded hole with a length of $L_1$ and an un-threaded hole with a length of $L_2$ from top to bottom, and the center hole in the lower part of the lower extending shaft of the feeder panel sequentially comprises an inner threaded hole with a length of $L_3$ and an un-threaded hole with a length of $L_4$ from bottom to top, wherein $L_2 \geq L_0$, $(L_3+L_4)$ is equal to $(L_e+L_0)$, $L_0$ is an extension and retraction adjustable length, $L_e$ is a shortest thread engaging length between the first extendable and retractable conductive rod or the first extendable and retractable contact tube and the lower extending shaft of the feeder panel, and the length of the outer threaded section on the upper part of the first extendable and retractable conductive rod or the first extendable and retractable contact tube is not smaller than $(L_1+L_e+L_0)$; alternatively, an inner through hole of the second locking nut sequentially comprises an inner threaded hole with a length of $L_5$ and an un-threaded hole with a length of $L_6$ from top to bottom, and the center hole in the lower part of the lower extending shaft of the feeder panel is an un-threaded hole with a length of $L_0$, wherein $L_6 \geq L_0$, and $L_0$ is an extension and retraction adjustable length.

6. The swing/rotating gas metal arc welding torch according to claim 5,
wherein the welding torch further comprises an inverted-L-shaped supporting frame consisting of a side plate and a top plate, wherein the lower side of the side plate of the supporting frame is fixedly connected to the electric brush base, and a welding torch coupling head is mounted on the upper end surface of the top plate of the supporting frame, and cable connecting heads are fixedly connected on the two side surfaces of the top plate of the supporting frame, so that a connecting cable of the electric brush passes through a cable fastener and then is connected to the cable connecting heads.

7. The swing/rotating gas metal arc welding torch according to claim 4,
wherein the welding torch further comprises an inverted-L-shaped supporting frame consisting of a side plate and a top plate, wherein the lower side of the side plate of the supporting frame is fixedly connected to the electric brush base, and a welding torch coupling head is mounted on the upper end surface of the top plate of the supporting frame, and cable connecting heads are fixedly connected on the two side surfaces of the top plate of the supporting frame, so that a connecting cable of the electric brush passes through a cable fastener and then is connected to the cable connecting heads.

8. The swing/rotating gas metal arc welding torch according to claim 1, wherein through holes for communicating with a welding shielding gas are longitudinally formed in the connecting screws, wherein the lower ends of the connecting screws are connected to a built-in gas passage in the wall of the electric bush base, and the upper ends of the connecting screws are connected to the welding shielding gas, so that the welding shielding gas passes through the inner through holes of the connecting screws and the built-in gas passage and then flows into an external nozzle mechanism of the welding torch body; and/or, through holes for communicating with cooling water are longitudinally formed in the two connecting screws, wherein the upper end of the connecting screw at a water inlet side is connected to a cooling water leading-in end, and the lower end thereof is connected to a built-in cooling water passage in the wall of the electric bush base, and the upper end of the connecting screw at a water outlet side is connected to a cooling water leading-out end and the lower end thereof is connected to the built-in cooling water passage, so that cooling water flows in from the inner through hole of the connecting screw at the water inlet side, passes through the built-in cooling water passage, and then flows out from the inner through hole of the connecting screw at the water outlet side.

9. The swing/rotating gas metal arc welding torch according to claim 8, wherein the built-in gas passage comprises two longitudinal gas passages, two transverse gas passages and an annular gas chamber;
wherein the annular gas chamber is a central counterbore larger than the small center hole, that is upwards formed from the bottom end surface of the electric brush base; the two longitudinal gas passages and the two transverse gas passages are respectively and symmetrically arranged at diagonally opposite sides of the annular gas chamber, wherein one ends of the transverse gas passages are connected to the lower ends of the longitudinal gas passages, and another ends of the transverse gas passages are connected to the annular gas chamber, and the upper ends of the longitudinal gas passages are connected to the inner through holes of the connecting screws, so that the welding shielding gas passes through the inner through holes of the connecting screws, the longitudinal gas passages, the transverse gas passages and the annular gas chamber, and then flows into a sleeve-shaped nozzle mechanism externally connected to the lower end of the welding torch body.

10. The swing/rotating gas metal arc welding torch according to claim 8, wherein the built-in cooling water passage comprises a longitudinal water inlet passage, a rectangular transverse water passage consisting of transverse water passages, and a longitudinal water outlet passage; wherein the transverse water passages are symmetrically arranged in the bottom wall of the electric brush base, and the longitudinal water inlet passage and the longitudinal water outlet passage are symmetrically arranged above the transverse water passages; the upper end of the longitudinal water inlet passage is connected to the inner through hole of a third connecting screw, and the lower end of the longitudinal water inlet passage is connected to the transverse water passages, and the upper end of the longitudinal water outlet passage is connected to the inner through hole of a fourth connecting screw and the lower end of the longitudinal water outlet passage is connected to the transverse water passages, so that cooling water passes through the inner through hole of the third connecting screw, the longitudinal water inlet passage, the transverse water passages and the longitudinal water outlet passage, and then flows out from the inner through hole of the fourth connecting screw.

11. The swing/rotating gas metal arc welding torch according to claim 8,
wherein the welding torch further comprises an inverted-L-shaped supporting frame consisting of a side plate and a top plate, wherein the lower side of the side plate of the supporting frame is fixedly connected to the electric brush base, and a welding torch coupling head is mounted on the upper end surface of the top plate of the supporting frame, and cable connecting heads are fixedly connected on the two side surfaces of the top plate of the supporting frame, so that a connecting cable of the electric brush passes through a cable fastener and then is connected to the cable connecting heads.

12. The swing/rotating gas metal arc welding torch according to claim 1, wherein the welding torch further comprises an inverted-L-shaped supporting frame consisting of a side plate and a top plate, wherein the lower side of the side plate of the supporting frame is fixedly connected to the electric brush base, and a welding torch coupling head is mounted on the upper end surface of the top plate of the supporting frame, and cable connecting heads are fixedly connected on the two side surfaces of the top plate of the supporting frame, so that a connecting cable of the electric brush passes through a cable fastener and then is connected to the cable connecting heads.

13. The swing/rotating gas metal arc welding torch according to claim 12, wherein when the welding torch comprises the supporting frame, the hollow shaft motor has double extending shafts, a photoelectric switch device for detecting an arc swing/rotating frequency or an arc swing midpoint C is arranged on the upper extending shaft; the photoelectric switch device is composed of an external grating disc and an optical coupler, and the optical coupler is fixedly connected to the supporting frame.

14. A use method of a swing/rotating gas metal arc welding torch, comprising the following steps:
(1) adopting a single-shaft extension hollow shaft motor or a double-shaft extension hollow shaft motor with a photoelectric switch device on an upper extending shaft of the motor as a drive motor of the swing/rotating arc welding torch, and obliquely feeding out a welding wire from an inner hole of a contact tube at the lower end of an eccentric or curved conductive rod mechanism after adjusting the conductive rod mechanism to a proper length by a conductive rod mechanism modulation method or an extension and retraction adjusting method of the welding torch or directly selecting the conductive rod mechanism with a proper length;
(2) setting arc swing/rotating process parameters by means of a controller of the welding torch, wherein arc swing/rotating frequency is adjusted and set by an arc swing/rotating frequency detection method based on sensing of a built-in photoelectric encoder of the single-shaft extension servo hollow shaft motor or an external photoelectric switch device of the double-shaft extension hollow shaft motor or an arc swing/rotating frequency calibration method based on detection of a speed meter; during swing arc welding, automatically bending the welding wire to the front or the rear of the welding direction by an arc swing midpoint detection method based on sensing of the built-in photoelectric encoder or the photoelectric switch device; and
(3) providing a welding shielding gas to an external nozzle mechanism of the welding torch body through a built-in gas passage of the welding torch body and/or an external gas passage of the nozzle mechanism; rotating by the drive motor an arc motion output shaft of the welding torch and the conductive rod mechanism connected to the lower end of the welding torch, to drive an arc on the end part of the welding wire to perform unidirectional rotating motion around a center line of the welding torch or reciprocating circular-arc-shaped swing, and detecting and displaying arc swing/rotating frequency according to the arc swing/rotating frequency detection method, thereby achieving swing/rotating gas metal arc welding,
wherein the frequency detection method comprises an arc swing frequency detection method and an arc rotating frequency detection method, wherein
the arc swing frequency detection method specifically comprises: in a process that the welding wire before welding or the arc during welding performs left and right symmetrical circular-arc-shaped swing around the arc swing midpoint C, detecting, by the servo motor driver, the motor rotating angle position in real time after decoding the motor rotating angle position electric signal output by the built-in photoelectric encoder of the servo motor, and according to a left side/right side positioning accomplishing pulse electric signal output by the servo motor driver when the motor rotates to the left side or right side limit position, detecting, by the controller of the welding torch, the elapsed time $t_1$ that the motor rotates to the limit positions for every successive three times or rotates to the limit position at the same side for every successive two times to realize real-time detection of the arc swing frequency $f_1$, wherein $f_1$ is equal to $1/t_1$; and
the arc rotating frequency detection method specifically comprises: in a process that the welding wire before welding or the arc during welding performs unidirectional rotating motion around the center line of the welding torch, detecting, by the servo motor driver, the motor rotating angle position in real time after decoding the motor rotating angle position electric signal output by the built-in photoelectric encoder of the servo motor, and according to a positioning accomplishing pulse electric signal for one revolution of the motor that is output by the servo motor driver, detecting, by the controller of the welding torch, a time interval $t_2$ between two adjacent positioning accomplishing pulses to realize real-time detection of the arc rotating frequency $f_2$, wherein $f_2$ is equal to $1/t_2$.

15. The use method of a swing/rotating gas metal arc welding torch according to claim 14, wherein the arc swing midpoint detection method comprises the following steps:
(1) when the built-in photoelectric encoder is an absolute photoelectric encoder, rotating the arc motion output shaft of the welding torch, so that the welding wire obliquely fed out from the conductive rod mechanism is bent to the front or the rear of the welding; and according to a motor rotation angle position electric pulse signal generated after the servo motor driver decodes the output signal of the built-in photoelectric encoder or directly according to a motor rotation angle position electric signal output by the built-in photoelectric encoder, recording, by the controller of the welding torch, an absolute position angle θ of motor rotation at a current position and taking the absolute position angle θ as a motor rotation midpoint position corresponding to an arc swing midpoint C, thereby achieving position setting of the arc swing midpoint C after initially mounting or replacing the conductive rod mechanism; and (2) before each welding, according to the motor rotation angle position electric pulse signal generated after the servo motor driver decodes the output signal of the built-in photoelectric encoder or directly according to the motor rotation angle position electric signal output by the built-in photoelectric encoder, guiding, by the controller of the welding torch, the motor to rotate to the motor rotation midpoint position corresponding to the absolute position angle θ, so that the welding wire obliquely fed out from the conductive rod mechanism is automatically bent to the front or the rear of the welding direction, thereby achieving automatic detection and positioning before welding of the arc swing midpoint C;

wherein when the curved conductive rod mechanism composed of the bent conductive rod and the first straight contact tube or the curved conductive rod mechanism composed of the second straight conductive rod and the second straight contact tube obliquely connected to the second straight conductive rod is adopted, and the conductive rod is fixedly connected to the arc motion output shaft in fixed and consistent relative positions by means of a connector mechanism, the operation in step is only used during initial mounting and debugging of the conductive rod mechanism; alternatively, when the curved conductive rod mechanism composed of the bent lower part of the arc motion output shaft and the first straight contact tube or the curved conductive rod mechanism composed of the second straight lower part of the arc motion output shaft and the second straight contact tube obliquely connected to the second straight lower part is adopted, the operation in step is only used during initial mounting and debugging of the conductive rod mechanism.

16. The use method of a swing/rotating gas metal arc welding torch according to claim 14, wherein the conductive rod mechanism modulation method comprises the following steps:

(1) selecting construction of the conductive rod mechanism: when an external sleeve-shaped nozzle mechanism is adopted for narrow gap or narrow groove multi-layer welding, the bent conductive rod is connected to the first straight contact tube, or the first straight conductive rod is connected to the bent contact tube or the eccentric contact tube or the second straight conductive rod is obliquely connected to the second straight contact tube to form a modulating eccentric or curved conductive rod mechanism; or directly, the first straight lower part of the arc motion output shaft is connected to the bent contact tube or the eccentric contact tube, or the second straight lower part is obliquely connected to the second straight contact tube, or the bent lower part is connected to the first straight contact tube to form a modulating eccentric or curved conductive rod mechanism;

(2) selecting the length of the conductive rod or the contact tube: by setting $L_1$ as a current vertical length of the conductive rod mechanism during welding of current weld to be welded, and $L_{i-1}$ as a last vertical length of the conductive rod mechanism during welding of last-layer weld, the conductive rod or contact tube is replaced with a shorter conductive rod or contact tube based on the adjusting principle of $L_1 = (L_{i-1} - h_0)$ according to a filler metal height $h_0$ of the last-layer weld every time welding of one layer of the weld is completed, so as to keep a height $h_2$ of the welding torch at a constant value when a height $h_1$ of the nozzle is kept constant;

(3) selecting an arc swing angle or an adjusting way for a length of the conductive rod mechanism for rotating arc welding: during swing arc welding, the arc swing angle is correspondingly adjusted to $\alpha_i$ based on an adjusting principle of $\sin(\alpha_i/2) = (R_{i-1}/R_i) \cdot \sin(\alpha_{i-1}/2)$ according to arc swing radius changes caused by replacing the straight contact tube or the eccentric contact tube, wherein $R_i$ is a current arc swing radius and $\alpha_i$ is a current arc swing angle during welding of the current weld to be welded, and $R_{i-1}$ is a last arc swing radius and $a_{i-1}$ is a last arc swing angle during welding of the last-layer weld; or during swing arc welding, the arc swing angle is kept unchanged after replacing with the bent contact tube or the conductive rod that has a shorter vertical section; or during rotating arc welding, adjustment on the length of the conductive rod or the contact tube is achieved by shortening the length of the vertical section of the conductive rod or the bent contact tube in step (2) based on the adjusting principle of keeping the arc rotating radius R constant; and (4) conditionally ending the modulation process: the modulation process of the steps (2) and (3) is stopped once the lower end part of the conductive rod mechanism is retracted into or nearly retracted into the sleeve-shaped nozzle mechanism; and the welding torch is lifted as a whole, so that each lifting amount of the welding torch position is approximately equal to the filler metal height $h_0$ of the last-layer weld, so as to keep the height $h_2$ of the welding torch constant until subsequent welding is accomplished.

17. The use method of a swing/rotating gas metal arc welding torch according to claim 14, wherein the conductive rod mechanism extension and retraction adjusting method comprises the following steps:

(1) loosening a first locking nut which is in thread pair connection with a first extendable and retractable conductive rod or a first extendable and retractable contact tube in the conductive rod mechanism, so that the upper end surface of the first locking nut is disengaged from the lower end surface of the arc motion output shaft of the welding torch to be in an unlocking state;

(2) rotating the first extendable and retractable conductive rod or the first extendable and retractable contact tube, so that the upper end of the first extendable and retractable conductive rod or the first extendable and retractable contact tube which is screwed in a threaded connection mode retracts upwards or extends downwards in the center hole in the lower part of the arc motion output shaft, wherein when an external sleeve-shaped nozzle mechanism is used for narrow gap or narrow groove multi-layer welding, each inward retraction adjusting amount of the first extendable and retractable conductive rod or the first extendable and retractable contact tube is approximately equal to the filler metal height $h_0$ of the last-layer weld; and (3) reversely rotating the first locking nut, so that the upper end surface of the first locking nut and the lower end surface of the arc motion output shaft are in a locking state, thereby achieving extendable and retractable adjustment on the length of the conductive rod mechanism, wherein the extendable and retractable conductive rod mechanism is composed of a first extendable and retractable conductive rod with outer threads on the upper part and a contact tube connected to the lower end of the first extendable and retractable conductive rod, or is directly composed of a first extendable and retractable contact tube with outer threads on the upper part.

18. The use method of a swing/rotating gas metal arc welding torch according to claim 14, wherein the conductive rod mechanism extension and retraction adjusting method comprises the following steps:

(1) adjusting preparation: loosening a second locking nut which is in thread pair connection with the outer threads on the upper part of a second extendable and retractable conductive rod or a second extendable and retractable contact tube in the conductive rod mechanism, so that the upper end surface of the second locking nut is disengaged from the lower end surface of a T-shaped adjusting nut which is also screwed on the outer threaded section to be in an unlocking state; loosening a connecting nut which is in thread pair connection with the outer threads on the lower part of the arc motion output shaft of the welding torch, so that the upper end of the T-shaped adjusting nut which is mated in the connecting nut is disengaged from the lower end surface of the arc motion output shaft;

(2) adjusting implementation: rotating the T-shaped adjusting nut, so that the flat upper end of the second extendable and retractable conductive rod or the second extendable and retractable contact tube which is inserted in a sliding mode retracts upwards or extends downwards in a waist-shaped through hole of a cylindrical or step-shaped cylindrical directional shaft sleeve fixed in the center hole in the lower part of the arc motion output shaft, wherein when an external sleeve-shaped nozzle mechanism is used for narrow gap or narrow groove multi-layer welding, each inward retraction adjusting amount of the second extendable and retractable conductive rod or the second extendable and retractable contact tube is approximately equal to the filler metal height $h_0$ of the last-layer weld; and (3) adjusting ending: reversely rotating and tightly screwing the connecting nut and pressing the lower end surface of a flanging flange at the top end of the T-shaped adjusting nut by inner convex shoulders at the lower end of the connecting nut, so that the upper end surface of the T-shaped adjusting nut and the lower end surface of the arc motion output shaft are in a pressing state; and then reversely rotating the second locking nut, so that the upper end surface of the second locking nut and the lower end surface of the T-shaped adjusting nut are in a locking state, thereby achieving extendable and retractable adjustment on the length of the conductive rod mechanism, wherein the extendable and retractable conductive rod mechanism is composed of a second extendable and retractable conductive rod with outer threads on the upper part and a contact tube connected to the lower end of the second extendable and retractable conductive rod, or is directly composed of a second extendable and retractable contact tube with outer threads on the upper part, and the outer threaded section is a flat cylinder with a waist-shaped cross section.

19. The use method of a swing/rotating gas metal arc welding torch according to claim 14, wherein the arc swing frequency calibration method comprises the following steps:

(1) within a set value range of an arc swing angle, slowly rotating a speed measuring wheel or a speed measuring rod of a universal electromagnetic or a photoelectric switch type tachymeter in a left-right reciprocating mode, and observing a number of times of work k of a speed measuring switch in a complete reciprocating rotating process by using a sound/light prompt function of the meter after the speed measuring switch is positioned within a rotating angle range covered by the arc swing angle;

or calibrating the swing frequency of the meter by means of an existing swing arc welding torch with an arc swing frequency real-time detection function or the swing arc welding torch adopting the photoelectric switch device 23, so as to determine a ratio k of a reading value of the meter to an actual value of the swing frequency, wherein k is a positive integer not smaller than 1;

(2) pressing the speed measuring wheel or the speed measuring rod against the side surface or the bottom end surface of the arc motion output shaft of the welding torch, so that the speed measuring switch is positioned within the rotating angle range covered by the arc swing angle; and setting, by the controller of the welding torch, the arc swing angle and the retention time at the two sides, and then adjusting a rotating speed control amount of the drive motor, so that the drive motor rotates the arc motion output shaft and drives the speed measuring wheel or the speed measuring rod to synchronously rotate in a reciprocating mode; and (3) detecting a reciprocating rotating frequency of the arc motion output shaft, and taking the current motor rotating speed control amount as a set value or a calibrated value in the controller of the arc swing frequency when the rotating frequency reading on the meter reaches k times the expected value of the arc swing frequency, thereby achieving calibration on the arc swing frequency.

* * * * *